(12) United States Patent
Abedini et al.

(10) Patent No.: US 11,974,232 B2
(45) Date of Patent: Apr. 30, 2024

(54) COORDINATION OF TRANSMIT POWER FOR DISTRIBUTED UNITS

(71) Applicant: QUALCOMM Incorporated, San Diego, CA (US)

(72) Inventors: Navid Abedini, Basking Ridge, NJ (US); Naeem Akl, Somerville, NJ (US); Jianghong Luo, Skillman, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 17/643,112

(22) Filed: Dec. 7, 2021

(65) Prior Publication Data

US 2023/0180145 A1 Jun. 8, 2023

(51) Int. Cl.
*H04W 52/34* (2009.01)
*H04W 52/36* (2009.01)
*H04W 52/38* (2009.01)

(52) U.S. Cl.
CPC ......... *H04W 52/34* (2013.01); *H04W 52/367* (2013.01); *H04W 52/386* (2013.01)

(58) Field of Classification Search
CPC .. H04W 52/34; H04W 52/367; H04W 52/386
See application file for complete search history.

(56) References Cited

U.S. PATENT DOCUMENTS

| | | | | |
|---|---|---|---|---|
| 9,332,504 B2 * | 5/2016 | Cheng | ................... | H04W 52/34 |
| 11,089,622 B2 * | 8/2021 | Luo | ....................... | H04L 1/0025 |
| 11,228,990 B2 * | 1/2022 | Jeon | ....................... | H04W 52/50 |
| 11,582,590 B2 * | 2/2023 | Cheraghi | .............. | G08G 1/0125 |
| 11,627,518 B2 * | 4/2023 | Luo | ........................ | H04W 48/16 455/446 |
| 11,729,243 B2 * | 8/2023 | Oyman | ................ | H04N 19/597 709/219 |
| 11,778,570 B2 * | 10/2023 | Abedini | ................ | H04W 52/36 370/280 |
| 2007/0004441 A1 * | 1/2007 | Breuer | ................... | H04W 52/34 455/127.1 |
| 2013/0107758 A1 * | 5/2013 | Waheed | .............. | H04W 52/245 370/256 |
| 2015/0057004 A1 * | 2/2015 | Cheng | ................. | H04W 52/146 455/446 |
| 2018/0059213 A1 * | 3/2018 | Wallstedt | ............... | H04K 3/226 |
| 2019/0373627 A1 * | 12/2019 | Luo | ........................ | H04W 24/10 |
| 2020/0336942 A1 * | 10/2020 | Li | ...................... | H04W 72/0446 |

(Continued)

FOREIGN PATENT DOCUMENTS

WO WO-2021023623 A1 * 2/2021 .......... H04W 56/002
WO WO-2023056241 A2 * 4/2023 .......... H04W 52/325

*Primary Examiner* — Hai V Nguyen

(74) *Attorney, Agent, or Firm* — Harrity & Harrity, LLP

(57) ABSTRACT

Various aspects of the present disclosure generally relate to wireless communication. In some aspects, a first node may transmit transmit power information for a distributed unit (DU) to a central unit (CU). The first node may receive, from the CU in connection with transmitting the transmit power information, an indication of a transmit power parameter to use for transmitting a communication. The first node may transmit the communication with a transmit power that is based at least in part on the transmit power parameter. Numerous other aspects are described.

30 Claims, 14 Drawing Sheets

(56) References Cited

U.S. PATENT DOCUMENTS

| | | | |
|---|---|---|---|
| 2020/0366986 A1* | 11/2020 | Ono | G10L 21/0208 |
| 2021/0006614 A1* | 1/2021 | Oyman | H04N 19/30 |
| 2021/0029649 A1* | 1/2021 | Cirik | H04W 52/0212 |
| 2021/0051579 A1* | 2/2021 | Luo | H04W 40/22 |
| 2021/0058826 A1* | 2/2021 | Mao | H04W 28/088 |
| 2021/0058970 A1* | 2/2021 | Kwak | H04L 5/0064 |
| 2021/0058989 A1* | 2/2021 | Simsek | H04L 47/283 |
| 2021/0112504 A1* | 4/2021 | Park | H04W 72/0453 |
| 2021/0204281 A1* | 7/2021 | Wu | H04W 76/11 |
| 2021/0352700 A1* | 11/2021 | Lohr | H04W 28/0278 |
| 2022/0222134 A1* | 7/2022 | Lai | G06F 11/0751 |
| 2022/0278891 A1* | 9/2022 | Damnjanovic | H04W 76/30 |
| 2022/0303966 A1* | 9/2022 | Deghel | H04W 72/23 |
| 2022/0322249 A1* | 10/2022 | Liu | H04W 52/365 |
| 2022/0322418 A1* | 10/2022 | Kim | H04W 28/18 |
| 2022/0330176 A1* | 10/2022 | Kowalski | H04W 52/325 |
| 2022/0360394 A1* | 11/2022 | Ly | H04L 5/0053 |
| 2022/0361222 A1* | 11/2022 | Chen | H04L 5/0053 |
| 2022/0369243 A1* | 11/2022 | Chen | H04W 52/325 |
| 2023/0029173 A1* | 1/2023 | Abedini | H04L 5/14 |
| 2023/0093673 A1* | 3/2023 | Narasimha Swamy | H04L 41/145 455/446 |
| 2023/0094751 A1* | 3/2023 | Nam | G01S 1/042 370/329 |
| 2023/0099006 A1* | 3/2023 | Popescu | G06N 3/0455 370/252 |
| 2023/0121938 A1* | 4/2023 | Zhou | H04W 72/23 375/347 |
| 2023/0127924 A1* | 4/2023 | Srinivasan | H04W 28/0268 370/328 |
| 2023/0156624 A1* | 5/2023 | Wang | H04W 52/346 455/522 |
| 2023/0156684 A1* | 5/2023 | Wang | H04W 72/0473 370/329 |
| 2023/0180147 A1* | 6/2023 | Kowalski | H04W 52/46 455/522 |
| 2023/0199816 A1* | 6/2023 | Zhang | H04W 72/541 370/396 |
| 2023/0308853 A1* | 9/2023 | Ding | H04W 4/40 |
| 2023/0362727 A1* | 11/2023 | Yuan | H04W 72/51 |
| 2024/0007314 A1* | 1/2024 | Yao | H04L 12/1435 |

\* cited by examiner

COORDINATION OF TRANSMIT POWER FOR DISTRIBUTED UNITS

FIELD OF THE DISCLOSURE

Aspects of the present disclosure generally relate to wireless communication and to techniques and apparatuses for coordinating transmit power for distributed units.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first node. The method may include transmitting transmit power information for a distributed unit (DU) to a central unit (CU). The method may include receiving, from the CU in connection with transmitting the transmit power information, an indication of a transmit power parameter to use for transmitting a communication. The method may include transmitting the communication with a transmit power that is based at least in part on the transmit power parameter.

Some aspects described herein relate to a method of wireless communication performed by a first node. The method may include receiving, by a CU of the first node, transmit power information associated with a DU. The method may include selecting a transmit power parameter for the DU to use for transmitting a communication based at least in part on the transmit power information and transmit power information associated with one or more other DUs. The method may include transmitting, to the DU, an indication of the transmit power parameter.

Some aspects described herein relate to a method of wireless communication performed by a first node. The method may include configuring, by a CU of the first node or another entity of the first node, a rule that specifies how a DU is to adjust a transmit power of the DU. The method may include transmitting, to the DU, an indication of the rule.

Some aspects described herein relate to a method of wireless communication performed by a first node. The method may include receiving, by a DU of the first node, an indication of a rule that specifies how the DU is to adjust a transmit power for transmitting a communication. The method may include adjusting the transmit power based at least in part on the rule. The method may include transmitting the communication using the transmit power.

Some aspects described herein relate to a first node for wireless communication. The first node may include a memory and one or more processors coupled to the memory. The one or more processors may be configured to transmit transmit power information for a DU to a CU. The one or more processors may be configured to receive, from the CU in connection with transmitting the transmit power information, an indication of a transmit power parameter to use for transmitting a communication. The one or more processors may be configured to transmit the communication with a transmit power that is based at least in part on the transmit power parameter.

Some aspects described herein relate to a first node for wireless communication. The first node may include a memory and one or more processors coupled to the memory. The one or more processors may be configured to receive, by a CU of the first node, transmit power information associated with a DU. The one or more processors may be configured to select a transmit power parameter for the DU to use for transmitting a communication based at least in part on the transmit power information and transmit power information associated with one or more other DUs. The one or more processors may be configured to transmit, to the DU, an indication of the transmit power parameter.

Some aspects described herein relate to a first node for wireless communication. The first node may include a memory and one or more processors coupled to the memory. The one or more processors may be configured to configure, by a central unit (CU) of the first node or another entity of the first node, a rule that specifies how a DU is to adjust a transmit power of the DU. The one or more processors may be configured to transmit, to the DU, an indication of the rule.

Some aspects described herein relate to a first node for wireless communication. The first node may include a memory and one or more processors coupled to the memory. The one or more processors may be configured to receive, by a DU of the first node, an indication of a rule that specifies how the DU is to adjust a transmit power for transmitting a communication. The one or more processors may be configured to adjust the transmit power based at least in part on the rule. The one or more processors may be configured to transmit the communication using the transmit power.

Some aspects described herein relate to a non-transitory computer-readable medium that stores a set of instructions for wireless communication by a first node. The set of instructions, when executed by one or more processors of the first node, may cause the first node to transmit transmit power information for a DU to a CU. The set of instructions, when executed by one or more processors of the first node, may cause the first node to receive, from the CU in connection with transmitting the transmit power information, an indication of a transmit power parameter to use for transmitting a communication. The set of instructions, when executed by one or more processors of the first node, may cause the first node to transmit the communication with a transmit power that is based at least in part on the transmit power parameter.

Some aspects described herein relate to a non-transitory computer-readable medium that stores a set of instructions for wireless communication by a first node. The set of instructions, when executed by one or more processors of the first node, may cause the first node to receive, by a CU of the first node, transmit power information associated with a DU. The set of instructions, when executed by one or more processors of the first node, may cause the first node to select a transmit power parameter for the DU to use for transmitting a communication based at least in part on the transmit power information and transmit power information associated with one or more other DUs. The set of instructions, when executed by one or more processors of the first node, may cause the first node to transmit, to the DU, an indication of the transmit power parameter.

Some aspects described herein relate to a non-transitory computer-readable medium that stores a set of instructions for wireless communication by a first node. The set of instructions, when executed by one or more processors of the first node, may cause the first node to configure, by a central unit (CU) of the first node or another entity of the first node, a rule that specifies how a DU is to adjust a transmit power of the DU. The set of instructions, when executed by one or more processors of the first node, may cause the first node to transmit, to the DU, an indication of the rule.

Some aspects described herein relate to a non-transitory computer-readable medium that stores a set of instructions for wireless communication by a first node. The set of instructions, when executed by one or more processors of the first node, may cause the first node to receive, by a DU of the first node, an indication of a rule that specifies how the DU is to adjust a transmit power for transmitting a communication. The set of instructions, when executed by one or more processors of the first node, may cause the first node to adjust the transmit power based at least in part on the rule. The set of instructions, when executed by one or more processors of the first node, may cause the first node to transmit the communication using the transmit power.

Some aspects described herein relate to an apparatus for wireless communication. The apparatus may include means for transmitting transmit power information for a DU to a CU. The apparatus may include means for receiving, from the CU in connection with transmitting the transmit power information, an indication of a transmit power parameter to use for transmitting a communication. The apparatus may include means for transmitting the communication with a transmit power that is based at least in part on the transmit power parameter.

Some aspects described herein relate to an apparatus for wireless communication. The apparatus may include means for receiving, by a CU of the apparatus, transmit power information associated with a DU. The apparatus may include means for selecting a transmit power parameter for the DU to use for transmitting a communication based at least in part on the transmit power information and transmit power information associated with one or more other DUs. The apparatus may include means for transmitting, to the DU, an indication of the transmit power parameter.

Some aspects described herein relate to an apparatus for wireless communication. The apparatus may include means for configuring, by a central unit (CU) of the apparatus or another entity of the apparatus, a rule that specifies how a DU is to adjust a transmit power of the DU. The apparatus may include means for transmitting, to the DU, an indication of the rule.

Some aspects described herein relate to an apparatus for wireless communication. The apparatus may include means for receiving, by a DU of the apparatus, an indication of a rule that specifies how the DU is to adjust a transmit power for transmitting a communication. The apparatus may include means for adjusting the transmit power based at least in part on the rule. The apparatus may include means for transmitting the communication using the transmit power.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
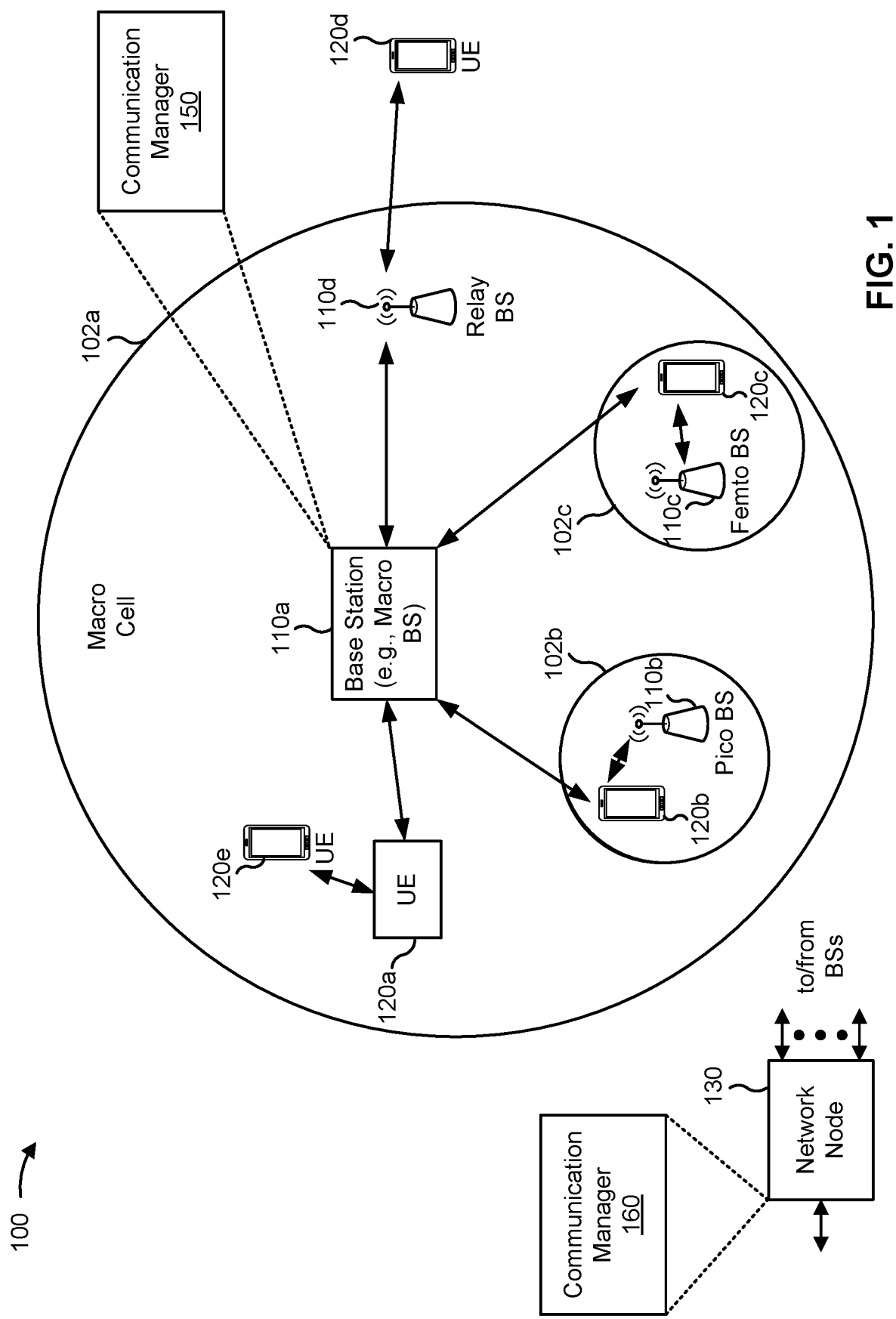
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller may couple to or communicate with a set of base stations 110 and may provide coordination and control for these base stations 110. The network controller may communicate with the base stations 110 via a backhaul communication link. The base stations 110 may communicate with one another directly or indirectly via a wireless or wireline backhaul communication link.

A network node 130 may communicate with a UE 120 via a base station 110. The network node 130 may be part of a core network. For example, the network node 130 may be an operations, administration and management (OAM) component.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first node (e.g., base station 110, network node 130) may include a communication manager 150 or 160. As described in more detail elsewhere herein, the communication manager 150 or 160 may transmit transmit power information for a distributed unit (DU) to a central unit (CU). The communication manager 150 or 160 may receive, from the CU in connection with transmitting the transmit power information, an indication of a transmit power parameter to use for transmitting a communication. The communication manager 150 or 160 may transmit the communication with a transmit power that is based at least in part on the transmit power parameter. Additionally, or alternatively, the communication manager 150 or 160 may perform one or more other operations described herein.

In some aspects, a first node (e.g., base station 110) may include a communication manager 150. As described in more detail elsewhere herein, the communication manager 150 may receive, by a CU of the first node, transmit power information associated with a DU. The communication manager 150 may select a transmit power parameter for the DU to use for transmitting a communication in based at least in part on the transmit power information and transmit power information associated with one or more other DUs. The communication manager 150 may transmit, to the DU, an indication of the transmit power parameter. Additionally, or alternatively, the communication manager 150 may perform one or more other operations described herein.

In some aspects, a first node (e.g., base station 110, network node 130) may include a communication manager 150 or 160. As described in more detail elsewhere herein, the communication manager 150 or 160 may configure, by a CU of the first node or another entity of the first node, a rule that specifies how a DU is to adjust a transmit power of the DU. The communication manager 150 or 160 may transmit, to the DU, an indication of the rule. Additionally, or alternatively, the communication manager 150 or 160 may perform one or more other operations described herein.

In some aspects, a first node (e.g., base station 110) may include a communication manager 150. As described in more detail elsewhere herein, the communication manager 150 may receive, by a DU of the first node, an indication of a rule that specifies how the DU is to adjust a transmit power for transmitting a communication. The communication manager 150 may adjust the transmit power based at least in part on the rule and transmit the communication using the transmit power. Additionally, or alternatively, the communication manager 150 may perform one or more other operations described herein.

As indicated above, FIG. 1 is provided as an example. Other examples may differ from what is described with regard to FIG. 1.

Figure 2:
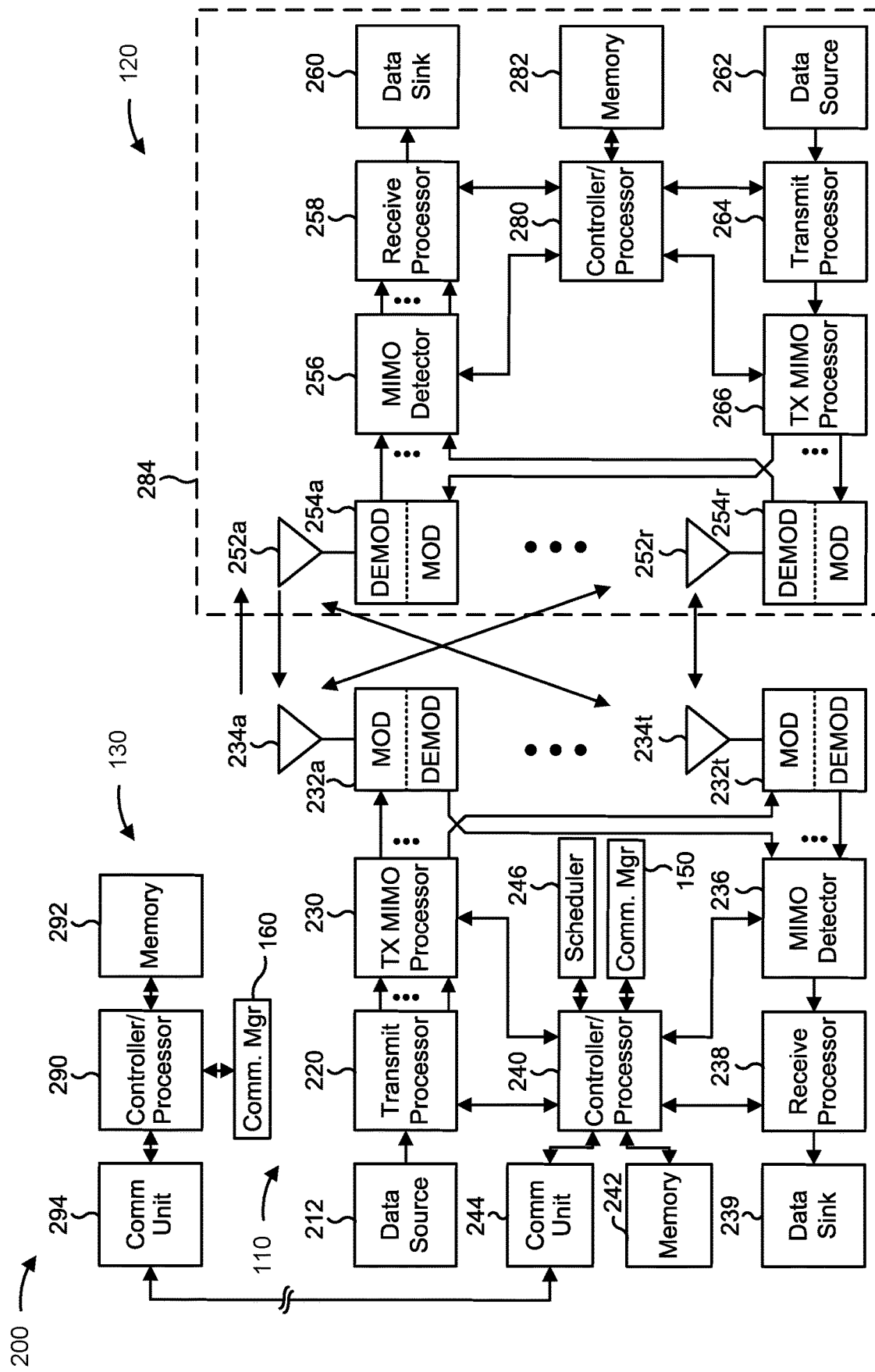
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network node 130 may include a communication unit 294, a controller/processor 290, and a memory 292. The network node 130 may include, for example, one or more devices in a core network. The network node 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network node 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-14).

The controller/processor 240 of the base station 110, the controller/processor 280 of the UE 120, the controller/processor 290 of the network node 130, and/or any other component(s) of FIG. 2 may perform one or more techniques associated with coordinating transmit powers of DUs, as described in more detail elsewhere herein. In some aspects, first node described herein is the base station 110, is included in the base station 110, or includes one or more components of the base station 110 shown in FIG. 2. In some aspects, the first node described herein is the network node 130, is included in the network node 130, or includes one or more components of the network node 130 shown in FIG. 2. For example, the controller/processor 240 of the base station 110, the controller/processor 290 of the network node 130, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 292 may store data and program codes for the base station 110 and the network node 130, respectively. In some examples, the memory 242 and/or the memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the network node 130, may cause the one or more processors, the network node 130, and/or the base station 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a first node (e.g., base station 110, network node 130) includes means for transmitting transmit power information for a DU to a CU; means for receiving, from the CU in connection with transmitting the transmit power information, an indication of a transmit power parameter to use for transmitting a communication; and/or means for transmitting the communication with a transmit power that is based at least in part on the transmit power parameter. In some aspects, the means for the first node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first node to perform operations described herein may include, for example, one or more of communication manager 160, communication unit 294, controller/processor 290, or memory 292.

In some aspects, a first node (e.g., base station 110) includes means for receiving, by a CU of the first node, transmit power information associated with a DU; means for selecting a transmit power parameter for the DU to use for transmitting a communication based at least in part on the transmit power information and transmit power information associated with one or more other DUs; and/or means for transmitting, to the DU, an indication of the transmit power parameter. In some aspects, the means for the first node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a first node (e.g., base station 110, network node 130) includes means for configuring, by a CU of the first node or another entity of the first node, a rule that specifies how a DU is to adjust a transmit power of the DU; and/or means for transmitting, to the DU, an indication of the rule. In some aspects, the means for the first node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first node to perform operations described herein may include, for example, one or more of communication manager 160, communication unit 294, controller/processor 290, or memory 292.

In some aspects, a first node (e.g., base station 110) includes means for receiving, by a DU of the first node, an indication of a rule that specifies how the DU is to adjust a transmit power for transmitting a communication; means for adjusting the transmit power based at least in part on the rule; and/or means for transmitting the communication using the transmit power. In some aspects, the means for the first node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
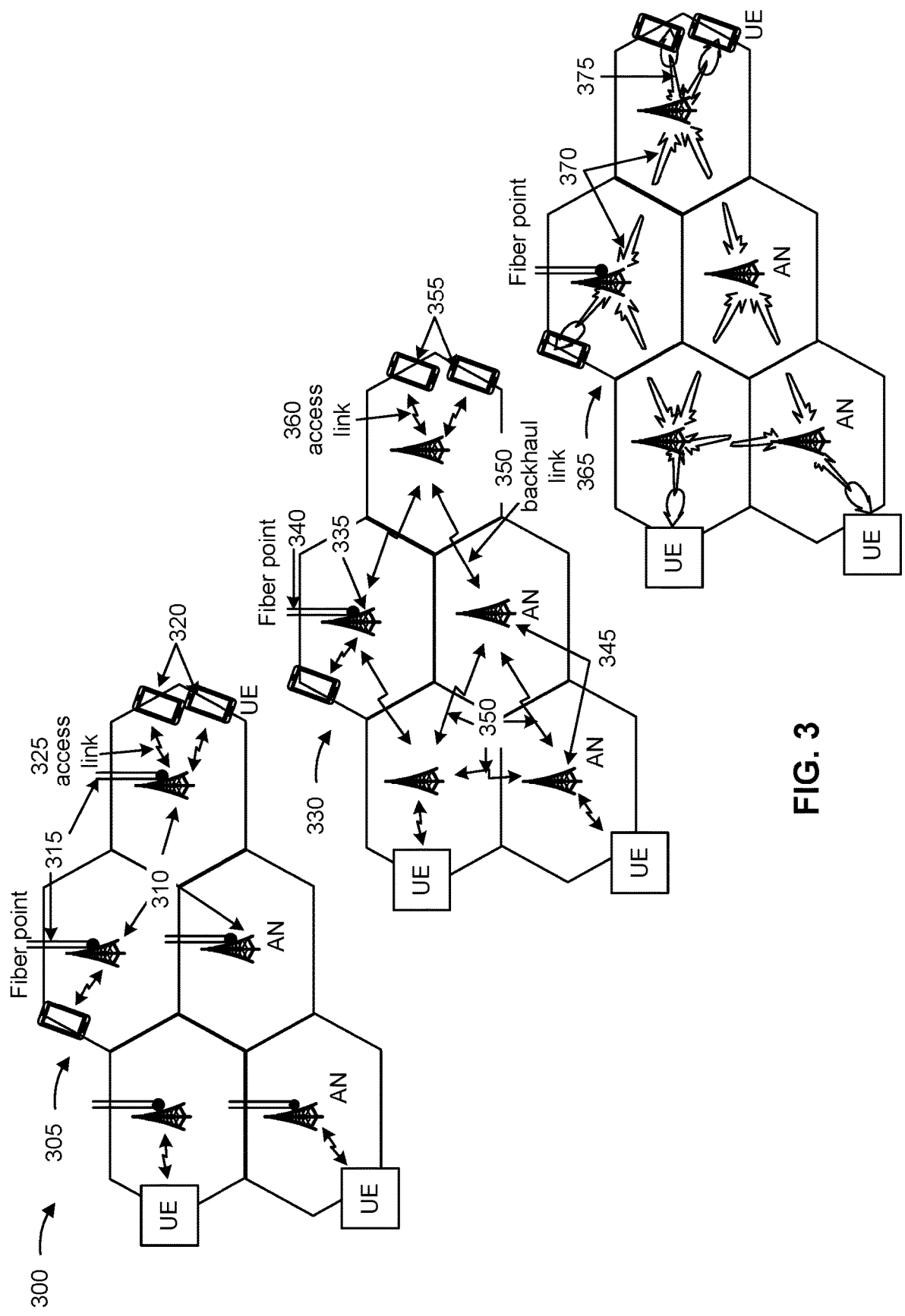
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

Some networks include base stations with split functionality between a controlling unit, such as a CU, and a radio access unit, such as a DU. One such radio access network may include an integrated access and backhaul (IAB) network. As shown by reference number 330, the IAB network may be a wireless backhaul network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
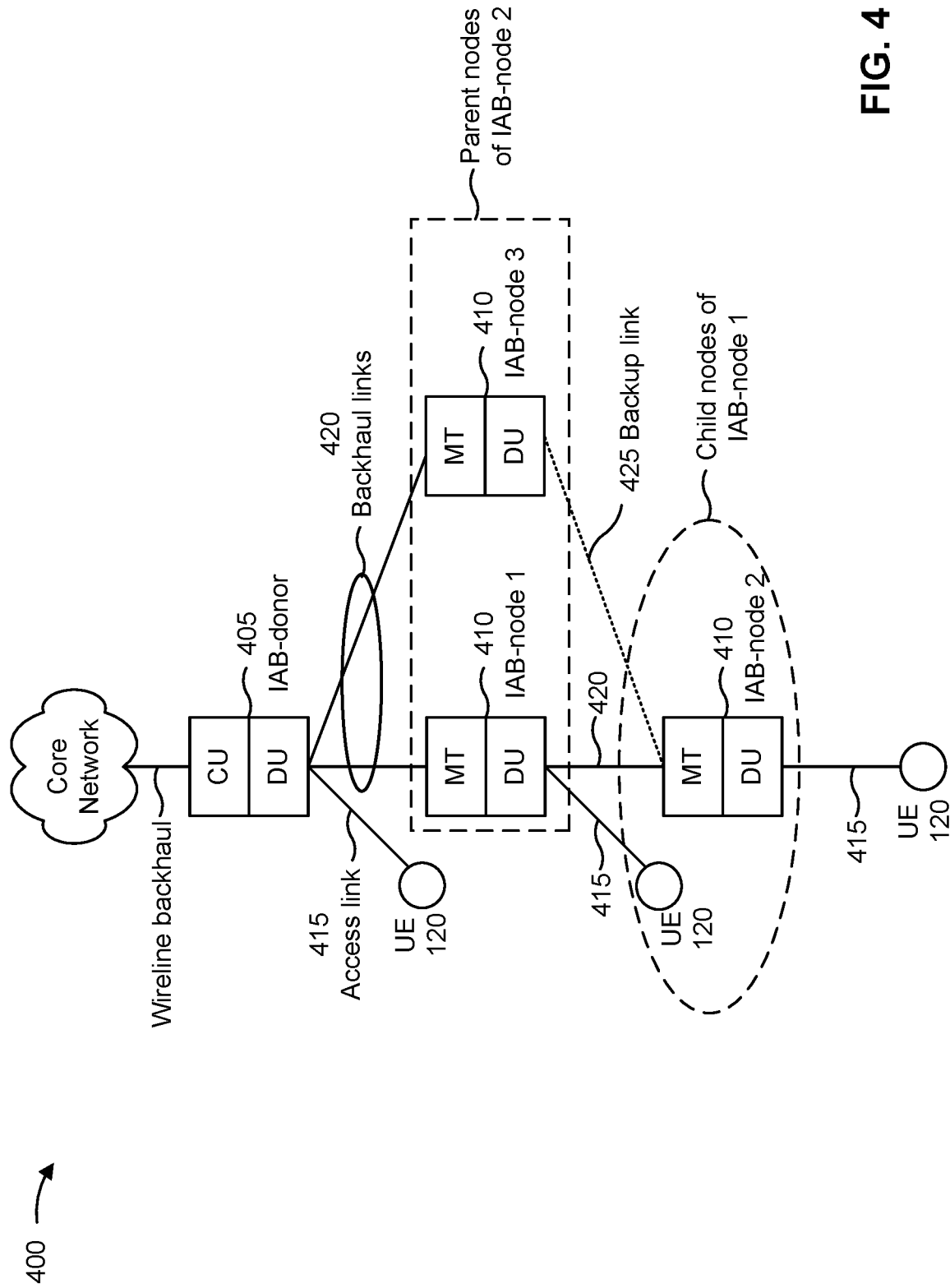
FIG. 4 is a diagram illustrating an example of an integrated access and backhaul network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform access node controller (ANC) functions and/or AMF functions. The CU may configure a DU of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message on an F1-C or F1-U interface).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. An IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

Resources configured in the IAB network may include time resources, frequency resources, and/or spatial resources. Such resources may be categorized as hard resources (may be used regardless of an MT's configuration), soft resources (may be used based on explicit indication from parent node or implicit determination of no impact to MT's operation), or non-available (NA) resources (DU cannot use the NA resources except for a set of specified cell-specific signals). The cell-specific signals may include a synchronization signal block (SSB), remaining minimum system information (RMSI) physical downlink control channel (PDCCH), a periodic channel state information reference signal (CSI-RS), or a scheduling request (SR).

A DU of an IAB-donor or an IAB-node in an IAB network may change a downlink transmit power to save energy. However, this can negatively impact other neighboring DU cells. For example, if the DU lowers its transmit power, this may introduce coverage gaps or increase the load on the neighboring DU cells.

As indicated above, FIG. 4 is provided as an example. Other examples may differ from what is described with regard to FIG. 4.

Figure 5:
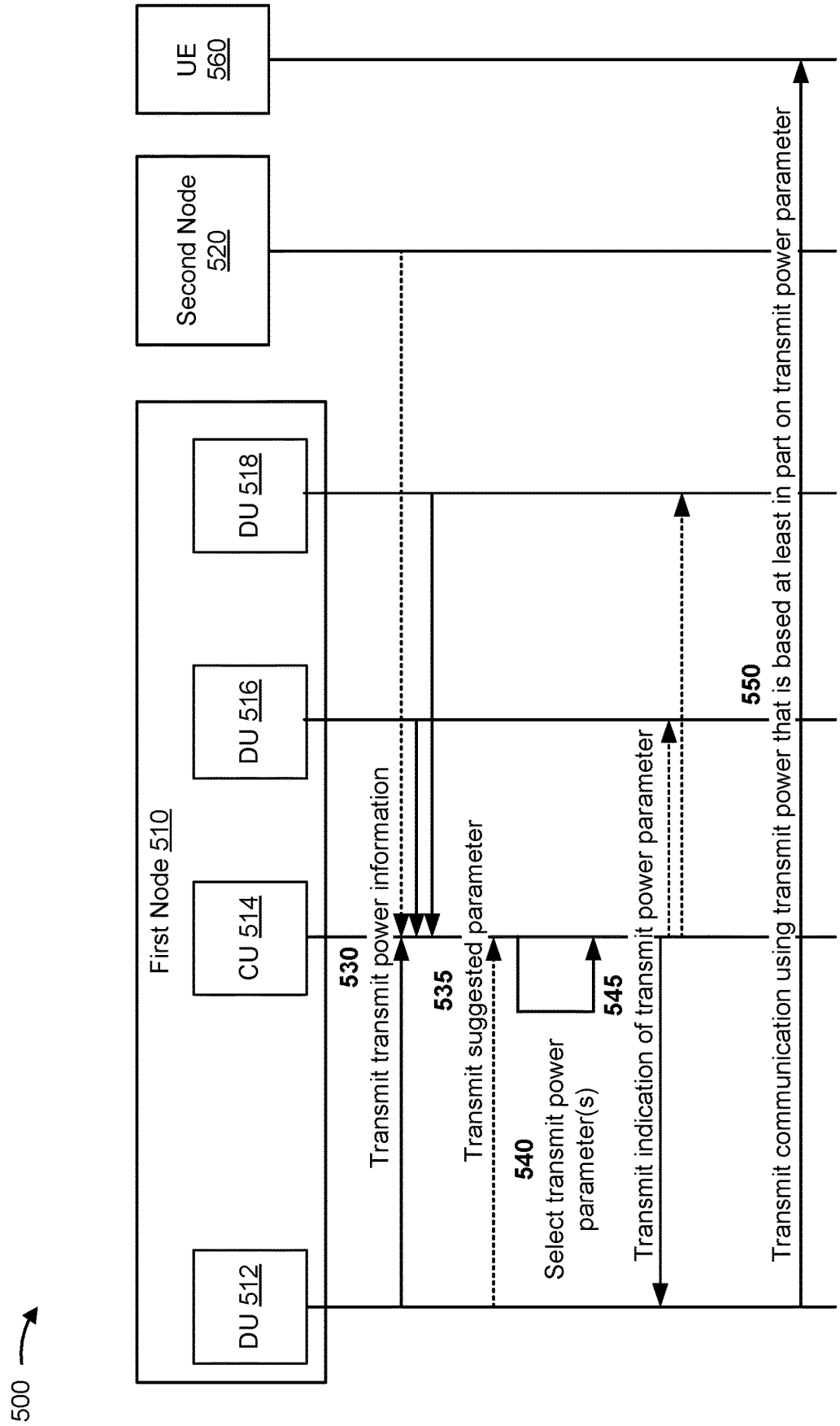
FIG. 5 is a diagram illustrating an example associated with coordinating transmit powers of distributed units, in accordance with the present disclosure.

FIG. 5 is a diagram illustrating an example 500 associated with coordinating transmit powers of DUs, in accordance with the present disclosure. The network in example 500 may be a wireless network with split functionality, such as an IAB network or a radio access network (with gNBs and access UEs). As shown in FIG. 5, for an IAB-network, a first node 510 (e.g., IAB-donor 405, IAB-node 410) may include a first DU 512. The first node 510 may also include a CU 514, a second DU 516, and a third DU 518. The CU 514, the second DU 516, and the third DU 518 may also be in one or more other nodes. The first DU 512 may communicate with the CU 514, DU 516, DU 518, and a second node 520 (e.g., IAB-donor 405, IAB-node 410, network node 130, and an OAM entity). For a radio access network, the DU 512 and CU 514 in example 500 together may be a gNB (e.g. base station 110), a second node may be another gNB (e.g. base station 110), and a child node may be a child UE (e.g., a UE 120).

A DU of a first node of the IAB network may have more local information (e.g., traffic conditions, MT status, channel conditions, interference conditions) than a CU for configuring a transmit power. However, the DU may not be aware of a transmit power of other DUs. According to various aspects described herein, the first node may transmit power information for the DU to the CU, and the CU may coordinate transmit powers of the DU and other DUs. As a result, the DU may use a transmit power in a serving DU cell that does not cause issues for DUs in neighboring cells. The other DUs may use transmit powers that do not cause issues for the DU.

The transmit power information may include a transmit power configuration of the DU (or the node), which may specify a current transmit power for the DU. The transmit power information may include a transmit power capability of the DU (or the node), which may specify what transmit power the DU is capable of supporting. The transmit power capability may include a dynamic range of transmit power, a maximum transmit power, a minimum transmit power, a supported granularity of a transmit power change (e.g., value of incremental power steps or shifts), a power headroom (how much higher the transmit power can go), a power legroom (how much lower the transmit power can go), or a power setting change latency. The transmit power information may apply to a total power of the DU (across the associated bandwidth) or to a specified power spectral density (PSD) (portion of a total power).

In some aspects, the transmit power information may be specified per DU, per DU cell, per TRP, per spatial resource (e.g., transmit beam, SSB index), per frequency resource (different configurations for different resource block (RB) groups), per time resource, or per resource type. Resource types may include downlink, flexible, full duplex, soft, hard, or NA. The transmit power information may be specified per child link or per access versus backhaul (for IAB). The transmit power information may be specified per duplexing type. For IAB, the duplexing type may refer to simultaneous MT transmit/receive and DU transmit/receive. For gNB, the duplexing type may refer to full-duplex versus half-duplex. The transmit power information may be specified per downlink signal type or per downlink channel type.

Example 500 shows coordination of transmit powers. As shown by reference number 530, DU 512 may transmit transmit power information to CU 514. DU 516 and/or DU 518 may also transmit transmit power information to CU 514. DU 512 may transmit the transmit power information to CU 514 as part of a list of served cell information (via an F1-AP interface). The transmit power information may be transmitted in response to a request from the CU 514. In some aspects, the second node 520 may be another node with another CU. CU 514 and the other CU may share transmit power information for DUs over an Xn interface. The sharing of the transmit power information may be triggered by a request from a CU, such as the other CU. In some aspects, the second node 520 may be an OAM entity, and the OAM entity may share the transmit power information with CU 514.

In some aspects, DU 512 may share one or more suggested parameters (values) that are associated with a transmit power. Such suggested transmit power parameters may include a suggested transmit power, a suggested maximum transmit power, a suggested minimum transmit power, or a suggested power ramping configuration. A power ramping configuration may include power change step values, a quantity of steps, and/or associated timing information. As shown by reference number 535, DU 512 may transmit the suggested transmit power parameter associated with the transmit power to CU 514. The one or more suggested transmit power parameters may be transmitted with the indication of the transmit power or may be transmitted separately.

In some aspects, a transmit power parameter may be specified for the total power or for a specified PSD. The transmit power parameter may be specified per DU, per DU cell, per TRP, per spatial resource, per frequency resource, per time resource, per resource type, per child link, per access verses backhaul, per duplexing type, per downlink signal type, or per downlink channel type. DU 512 may transmit the transmit power parameter as part of a list of served cells to be activated or updated (e.g., via an F1-AP interface). In some aspects, if the second node 520 includes another CU, CU 514 and the other CU may share parameters for DUs over an Xn interface. The sharing of the parameters may be triggered by a request from a CU, such as the other CU.

As shown by reference number 540, CU 514 may select a transmit power parameter for DU 512 based at least in part on the transmit power information from DU 512 and the transmit power information from other DUs, such as the transmit powers or transmit power parameters of DU 516 and DU 518. Transmit power parameters may include, for example, a specific transmit power, a maximum transmit power, a minimum transmit power, or a power ramping configuration. In some aspects, CU 514 may select the transmit power parameter for DU 512 based at least in part on a transmit power capability of DU 512 and/or transmit power parameters suggested by DU 512. Selection of the transmit power parameter for DU 512 may involve adjusting the transmit power by increasing the transmit power or decreasing the transmit power. CU 514 may decrease the transmit power for DU 512 while adjusting a transmit power, schedule, or coverage of DU 516 and/or DU 518. In this way, an overall network energy consumption by the first node 510 and/or other nodes in the IAB network (or other split functionality network) may decrease.

As shown by reference number 545, CU 514 may transmit an indication of the transmit power parameter to DU 512. CU 514 may also transmit an indication of a transmit power parameter for DU 516 to DU 516 and an indication of a transmit power parameter for DU 518 to DU 518. That is, CU 514 may coordinate transmit powers among DU 512, DU 516, and DU 518. In some aspects, the indication of the transmit power parameter may indicate a suggested (desired) transmit power parameter for DU 512, and DU 512 may decide whether to adopt the suggested transmit power parameter. In other words, DU 512 may adopt a suggested transmit power parameter as an active transmit power parameter or reject the suggested transmit power parameter and use a transmit power parameter different than the suggested transmit power parameter. DU 512 may determine whether to use a suggested transmit power parameter based at least in part on a configuration of DU 512, traffic conditions or channel conditions associated with DU 512, an operating status of DU 512, and/or an operating status of one or more UEs served by DU 512.

As shown by reference number 550, DU 512 (or the first node of DU 512) may transmit a communication using a transmit power for DU 512 that is based at least in part on the transmit power parameter. This may include a communication to a UE 560 (e.g., UE 120, an MT in IAB-node 410) that is in a cell that is served by DU 512.

In some aspects, the DUs, CU 514, and/or the second node 520 may transmit transmit power information and indications of transmit power parameters using over-the-air (OTA) signaling. OTA signaling may include wireless transmissions that travel through the air rather than through wired links. The first node 510, the second node 520, and/or any components of the nodes may have receivers that are configured to receive and process OTA signals. For example, the nodes may be equipped with a UE modem (similar to an MT of an IAB-node). In some aspects, the network nodes may be able to transmit signals over a sidelink channel.

As indicated above, FIG. 5 is provided as an example. Other examples may differ from what is described with respect to FIG. 5.

Figure 6:
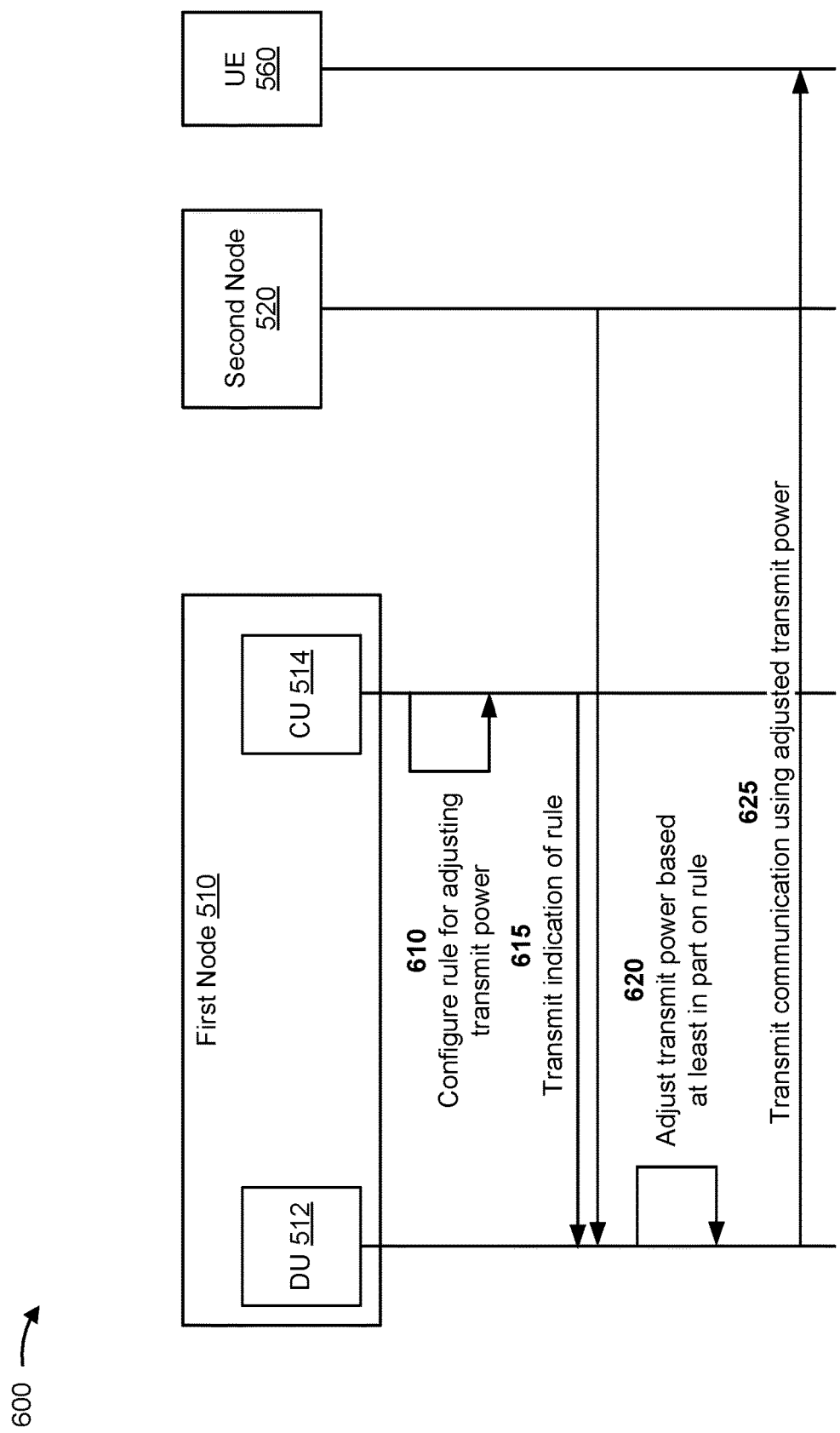
FIG. 6 is a diagram illustrating an example associated with using a rule to adjust a transmit power, in accordance with the present disclosure.

FIG. 6 is a diagram illustrating an example 600 associated with using a rule to adjust a transmit power, in accordance with the present disclosure.

In some aspects, CU 514 or another entity (e.g., second node 520) may configure a rule for DU 512 to adjust its transmit power. In this way, CU 514 still coordinate transmit powers among DUs, but with less signaling. As a result, CU 514 conserves energy and signaling resources.

As shown by reference number 610, CU 514 may configure a rule to be used by DU 512 to adjust a transmit power. The rule may be specific to DU 512 or a group of DUs to which DU 512 belongs. The rule may specify that DU 512 is to adjust the transmit power based at least in part on one or more factors that DU 512 can determine.

As shown by reference number 615, the CU 514 may transmit an indication of the rule to DU 512. The indication may specify the rule or refer to an index or value that can be used to look up the rule. In some aspects, DU 512 may receive the rule from another node, such as the second node 520 (e.g., another CU, core network component).

As shown by reference number 620, DU 512 may adjust a transmit power for DU 512 based at least in part on the rule. For example, the rule may specify that DU 512 is to adjust the transmit power based at least in part on a measurement of a receive power from a neighboring DU cell or the detection of a neighboring DU cell. The rule may specify that DU 512 is to adjust the transmit power based at least in part on a measurement performed on a downlink signal by a UE that DU 512 serves and/or a quantity of UEs being served. The measurement may indicate that the downlink signal is sufficiently strong at the UE and that DU 512 may decrease the transmit power (or increase the transmit power if the signal is weak). The rule may specify that DU 512 is to adjust the transmit power based at least in part on a load or a remaining capacity of a serving DU cell, or a location or a zone of the serving DU cell. DU 512 may decrease the transmit power as much as the load or capacity will allow. The rule may specify that DU 512 is to adjust the transmit power based at least in part on random access channel statistics. The rule may specify that DU 512 is to adjust the transmit power based at least in part on mobility states of the serving DU cell, neighboring UEs, or neighboring network nodes.

In some aspects, CU 514 may request some rules for DU cells associated with a CU of the second node 520. CU 514 may also transmit information to the CU of the second node 520 about rules used for CU 514's own DU cells. In some aspects, signaling between the CUs and/or the DUs may involve OTA signaling.

As shown by reference number 625, DU 512 may transmit a communication using the adjusted transmit power. For example, DU 512 may transmit a communication to UE 560 using a decreased transmit power. By configuring DU 512 with a rule to adjust a transmit power, CU 514 may cause the first node 510 to conserve energy while reducing signaling resources.

As indicated above, FIG. 6 is provided as an example. Other examples may differ from what is described with respect to FIG. 6.

Figure 7:
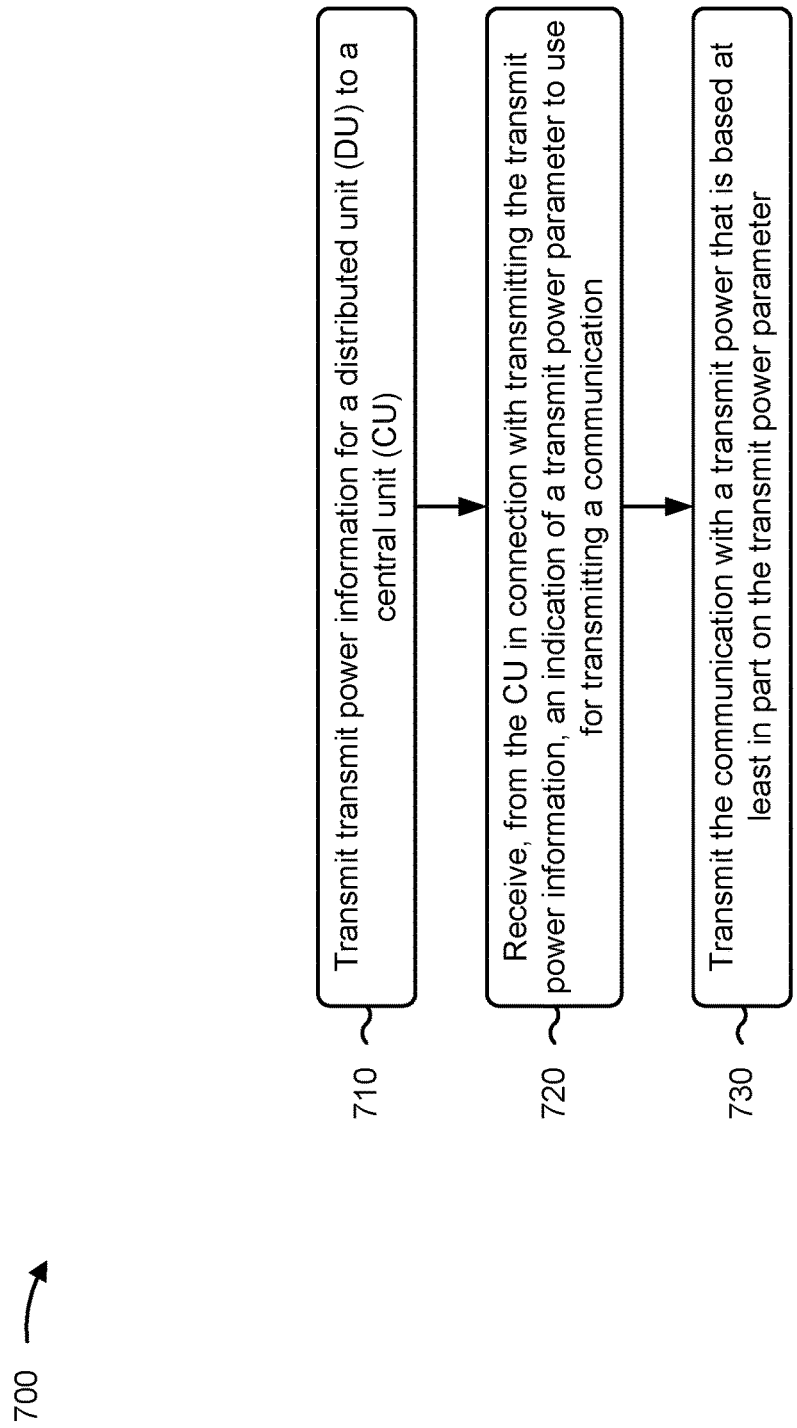
FIGS. 7-10 are diagrams illustrating example processes performed, for example, by a first node, in accordance with the present disclosure.

FIG. 7 is a diagram illustrating an example process 700 performed, for example, by a first node, in accordance with the present disclosure. Example process 700 is an example where the first node (e.g., base station 110, network node 130, first node 510, second node 520) performs operations associated with coordinating transmit power for DUs. The first node may be part of an IAB network or another network with split CU/DU functionality.

As shown in FIG. 7, in some aspects, process 700 may include transmitting transmit power information for a DU to a CU (block 710). For example, the first node (e.g., using communication manager 150 or 160 and/or transmission component 1104 depicted in FIG. 11) may transmit transmit power information for a DU to a CU, as described above in connection with FIGS. 3-5.

As further shown in FIG. 7, in some aspects, process 700 may include receiving, from the CU in connection with transmitting the transmit power information, an indication of a transmit power parameter to use for transmitting a communication (block 720). For example, the first node (e.g., using communication manager 150 or 160 and/or reception component 1102 depicted in FIG. 11) may receive, from the CU in connection with transmitting the transmit power information, an indication of a transmit power parameter to use for transmitting a communication, as described above in connection with FIGS. 3-5.

As further shown in FIG. 7, in some aspects, process 700 may include transmitting the communication with a transmit power that is based at least in part on the transmit power parameter (block 730). For example, the first node (e.g., using communication manager 150 or 160 and/or transmission component 1104 depicted in FIG. 11) may transmit the communication with a transmit power that is based at least in part on the transmit power parameter, as described above in connection with FIGS. 3-5.

Process 700 may include additional aspects, such as any single aspect or any combination of aspects described below and/or in connection with one or more other processes described elsewhere herein.

In a first aspect, the transmit power information includes one or more of a transmit power configuration of the DU or a transmit power capability of the DU.

In a second aspect, alone or in combination with the first aspect, the first node includes the DU, and transmitting the transmit power information includes transmitting the transmit power information from the DU.

In a third aspect, alone or in combination with one or more of the first and second aspects, the transmit power information includes one or more of a dynamic range for transmit power, a maximum transmit power, a minimum transmit power, a supported granularity of a transmit power change, a current transmit power, a transmit power headroom, a transmit power legroom, or a power setting change latency.

In a fourth aspect, alone or in combination with one or more of the first through third aspects, the transmit power information is for a total power across a bandwidth part or for a PSD.

In a fifth aspect, alone or in combination with one or more of the first through fourth aspects, the transmit power information is specific to a DU, a DU cell, a transmit receive point, a spatial resource, a frequency resource, a time resource, a child link, an access or a backhaul, a downlink signal type, a downlink channel type, a resource type, or a duplexing type.

In a sixth aspect, alone or in combination with one or more of the first through fifth aspects, transmitting the transmit power information includes transmitting the transmit power information via an F1-AP interface.

In a seventh aspect, alone or in combination with one or more of the first through sixth aspects, process 700 includes receiving, from the CU, a request for the transmit power information, and transmitting the transmit power information includes transmitting the transmit power information in connection with receiving the request.

In an eighth aspect, alone or in combination with one or more of the first through seventh aspects, the CU is in a second node, and transmitting the transmit power information includes transmitting the transmit power information by a CU of the first node to the CU in the second node via an Xn interface.

In a ninth aspect, alone or in combination with one or more of the first through eighth aspects, the first node is an OAM entity.

In a tenth aspect, alone or in combination with one or more of the first through ninth aspects, the transmit power parameter includes a transmit power, a maximum transmit power, a minimum transmit power, or a power ramping configuration, and transmitting the communication includes transmitting the communication further based at least in part on the transmit power parameter. In some aspects, the transmit power parameter is a suggested transmit power parameter that includes a suggested transmit power, a suggested maximum transmit power, a suggested minimum transmit power, or a suggested power ramping configuration. If the transmit power parameter is a suggested transmit power parameter, the DU is able to use the suggested transmit power parameter or not use the suggested transmit power parameter based at least in part on a configuration of the DU, traffic conditions or channel conditions associated with the DU, an operating status of the DU, and/or an operating status of one or more UEs served by the DU.

In an eleventh aspect, alone or in combination with one or more of the first through tenth aspects, the transmit power parameter is specific to a DU, a DU cell, a TRP, a spatial resource, a frequency resource, a time resource, a child link, an access or backhaul, a downlink signal type, a downlink channel type, a resource type, or a duplexing type.

In a twelfth aspect, alone or in combination with one or more of the first through eleventh aspects, receiving the indication includes receiving the indication via an F1-AP interface.

In a thirteenth aspect, alone or in combination with one or more of the first through twelfth aspects, one or more of transmitting the transmit power information or receiving the indication includes using OTA signaling.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
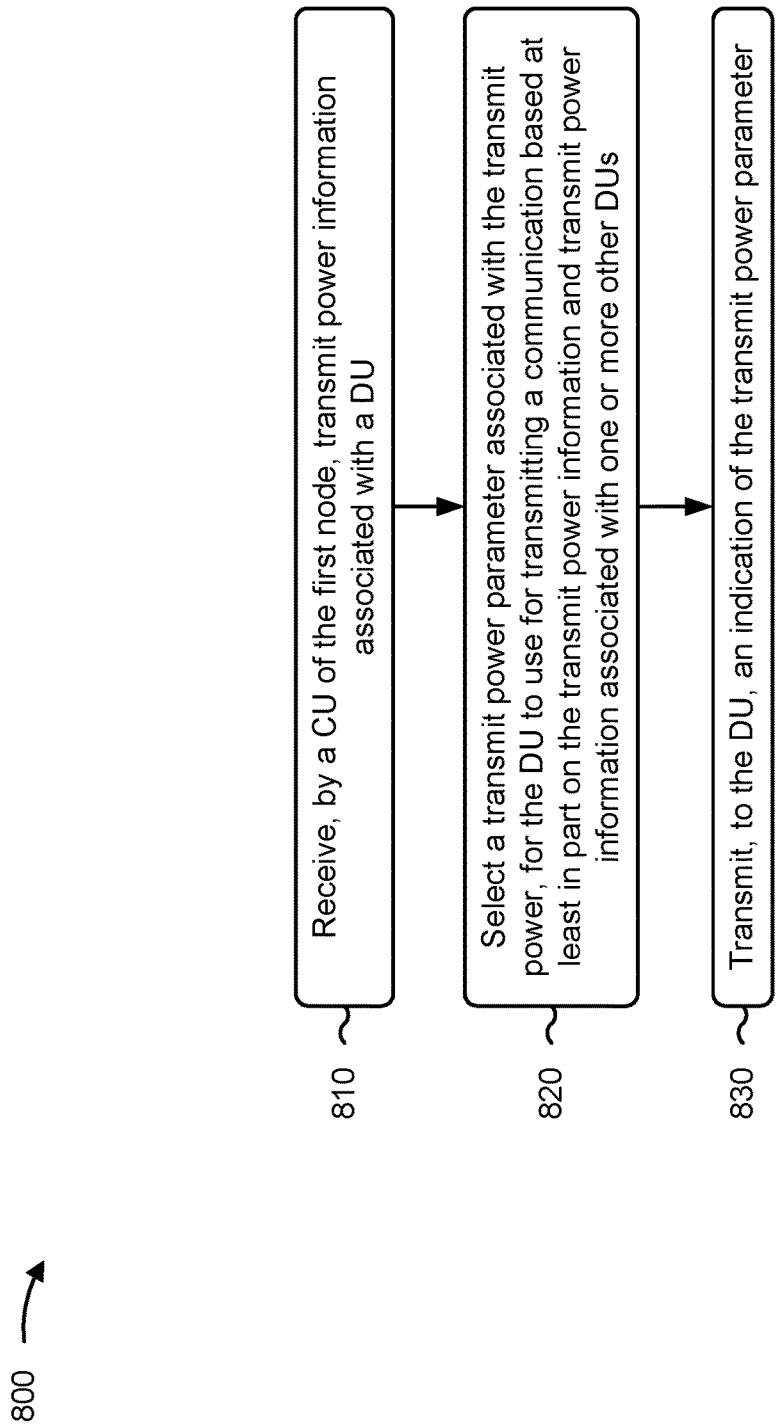

FIG. 8 is a diagram illustrating an example process 800 performed, for example, by a first node, in accordance with the present disclosure. Example process 800 is an example where the first node (e.g., base station 110, first node 510) performs operations associated with coordinating transmit power for DUs. The first node may be part of an IAB network or another network with split CU/DU functionality.

As shown in FIG. 8, in some aspects, process 800 may include receiving, by a CU of the first node, transmit power information associated with a DU (block 810). For example, the first node (e.g., using communication manager 150 and/or reception component 1202 depicted in FIG. 12) may receive, by a CU of the first node, transmit power information associated with a DU, as described above in connection with FIGS. 3-5.

As further shown in FIG. 8, in some aspects, process 800 may include selecting a transmit power parameter for the DU to use for transmitting a communication based at least in part on the transmit power information and transmit power information associated with one or more other DUs (block 820). For example, the first node (e.g., using communication manager 150 and/or selection component 1208 depicted in FIG. 12) may select a transmit power parameter for the DU to use for transmitting a communication based at least in part on the transmit power information and transmit power information associated with one or more other DUs, as described above in connection with FIGS. 3-5.

As further shown in FIG. 8, in some aspects, process 800 may include transmitting, to the DU, an indication of the transmit power parameter (block 830). For example, the first node (e.g., using communication manager 150 and/or transmission component 1204 depicted in FIG. 12) may transmit, to the DU, an indication of the transmit power parameter, as described above in connection with FIGS. 3-5.

Process 800 may include additional aspects, such as any single aspect or any combination of aspects described below and/or in connection with one or more other processes described elsewhere herein.

In a first aspect, receiving the transmit power information includes receiving the transmit power information from the DU, and the DU is in the first node or in a second node.

In a second aspect, alone or in combination with the first aspect, the transmit power information includes one or more of a transmit power configuration of the DU or a transmit power capability of the DU.

In a third aspect, alone or in combination with one or more of the first and second aspects, the transmit power information includes one or more of a dynamic range for transmit power, a maximum transmit power, a minimum transmit power, a supported granularity of a transmit power change, a current transmit power, a transmit power headroom, a transmit power legroom, or a power setting change latency.

In a fourth aspect, alone or in combination with one or more of the first through third aspects, the transmit power information is for a total power across a bandwidth part or for a PSD.

In a fifth aspect, alone or in combination with one or more of the first through fourth aspects, the transmit power information is specific to the DU, a DU cell, a TRP, a spatial resource, a frequency resource, a time resource, a child link, an access or backhaul, a downlink signal or channel type, a resource type, or a duplexing scenario.

In a sixth aspect, alone or in combination with one or more of the first through fifth aspects, receiving the transmit power information includes receiving the transmit power information via an F1-AP interface, from a CU of a second node via an Xn interface, or from an OAM entity.

In a seventh aspect, alone or in combination with one or more of the first through sixth aspects, the transmit power parameter includes a transmit power, a maximum transmit power, a minimum transmit power, a power ramping configuration, a suggested transmit power, a suggested maximum transmit power, a suggested minimum transmit power, or a suggested power ramping configuration.

In an eighth aspect, alone or in combination with one or more of the first through seventh aspects, process 800 includes transmitting a request for the transmit power information, and receiving the transmit power information includes receiving the transmit power information in connection with transmitting the request.

In a ninth aspect, alone or in combination with one or more of the first through eighth aspects, process 800 includes receiving, from a second node, a request for the transmit power parameter, and transmitting the indication of the transmit power parameter to the other node in connection with receiving the request.

In a tenth aspect, alone or in combination with one or more of the first through ninth aspects, the transmit power parameter is specific to the DU, a DU cell, a TRP, a spatial resource, a frequency resource, a time resource, a child link, an access or backhaul, a downlink signal or channel type, a resource type, or a duplexing scenario.

In an eleventh aspect, alone or in combination with one or more of the first through tenth aspects, one or more of receiving the transmit power information or transmitting the indication of the transmit power parameter includes using OTA signaling.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
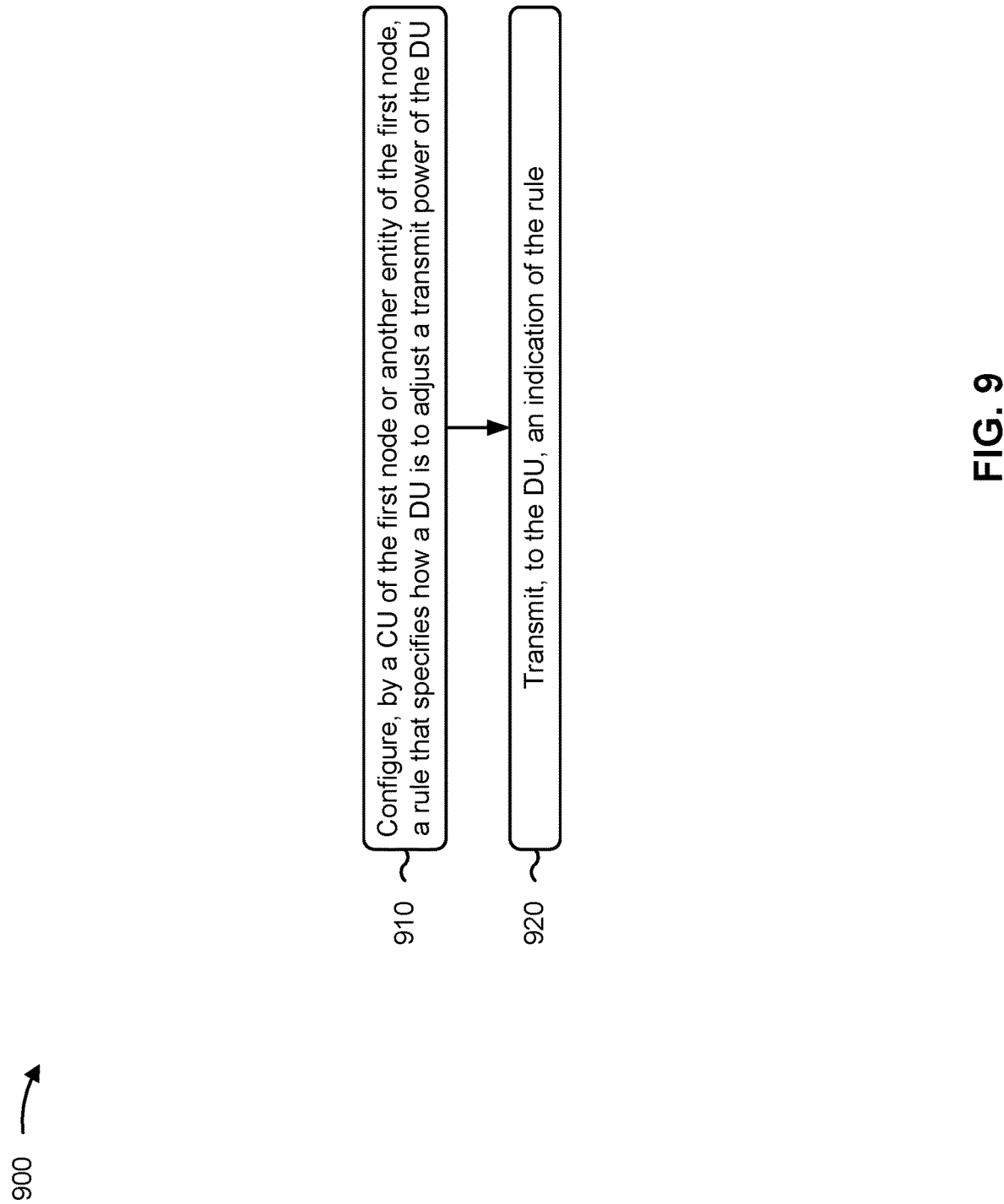

FIG. 9 is a diagram illustrating an example process 900 performed, for example, by a first node, in accordance with the present disclosure. Example process 900 is an example where the first node (e.g., base station 110, network node 130, first node 510, second node 520) performs operations associated with coordinating transmit power for DUs. The first node may be part of an IAB network or another network with split CU/DU functionality.

As shown in FIG. 9, in some aspects, process 900 may include configuring, by a CU of the first node or another entity of the first node, a rule that specifies how a DU is to adjust a transmit power of the DU (block 910). For example, the first node (e.g., using communication manager 150 or 160 and/or rule component 1308 depicted in FIG. 13) may configure, by a CU of the first node or another entity of the first node, a rule that specifies how a DU is to adjust a transmit power of the DU, as described above in connection with FIGS. 3-6.

As further shown in FIG. 9, in some aspects, process 900 may include transmitting, to the DU, an indication of the rule (block 920). For example, the first node (e.g., using communication manager 150 or 160 and/or transmission component 1304 depicted in FIG. 13) may transmit, to the DU, an indication of the rule, as described above in connection with FIGS. 3-6.

Process 900 may include additional aspects, such as any single aspect or any combination of aspects described below and/or in connection with one or more other processes described elsewhere herein.

In a first aspect, the rule is associated with one or more of a measurement of a receive power from a neighboring DU cell, a measurement performed by a UE, detection of the neighboring DU cell, a quantity of UEs being served, a load or a remaining capacity of a serving DU cell, random access channel (RACH) statistics, mobility states of the serving DU cell, neighboring UEs, or neighboring network nodes, or a location or a zone of the serving DU cell.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
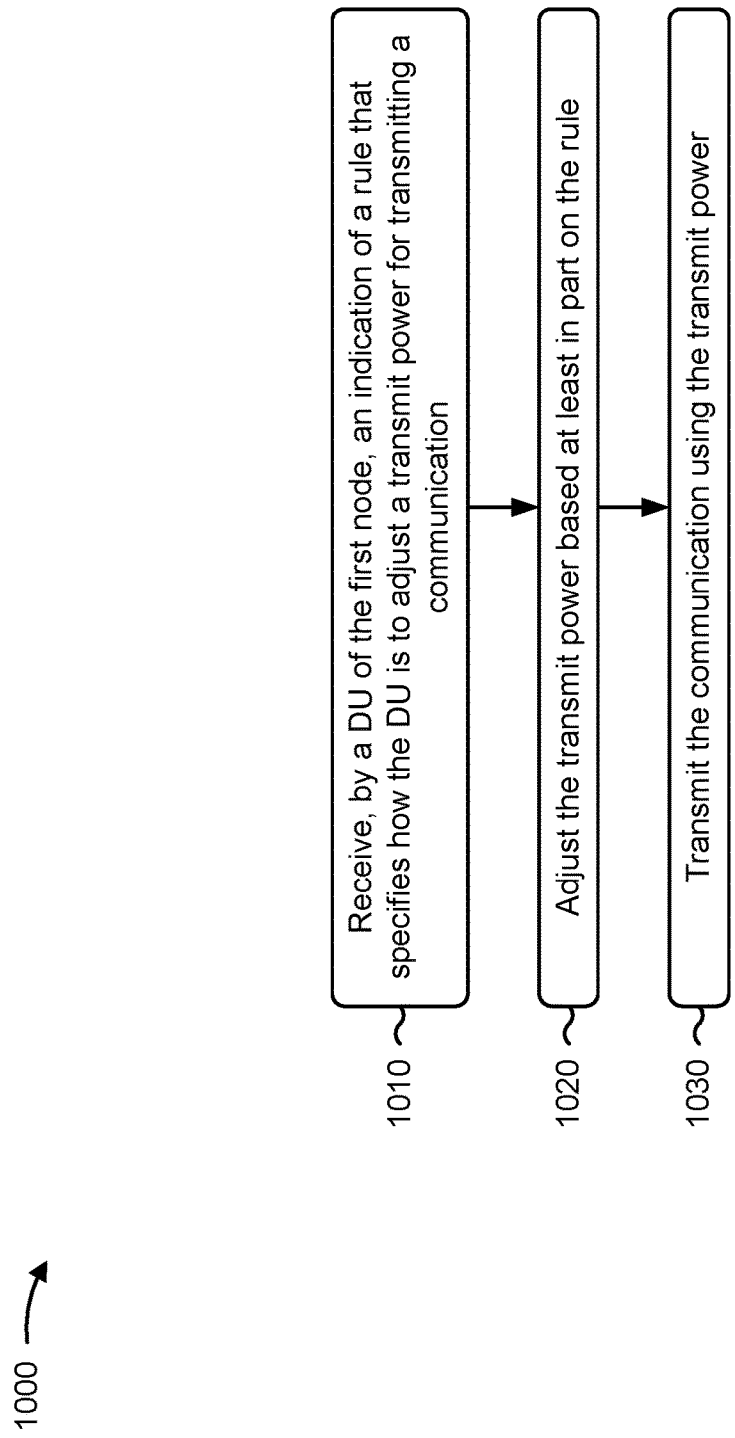

FIG. 10 is a diagram illustrating an example process 1000 performed, for example, by a first node, in accordance with the present disclosure. Example process 1000 is an example where the first node (e.g., base station 110, first node 510) performs operations associated with coordinating transmit power for DUs. The first node may be part of an IAB network or another network with split CU/DU functionality.

As shown in FIG. 10, in some aspects, process 1000 may include receiving, by a DU of the first node, an indication of a rule that specifies how the DU is to adjust a transmit power for transmitting a communication (block 1010). For example, the first node (e.g., using communication manager 150 and/or reception component 1402 depicted in FIG. 14) may receive, by a DU of the first node, an indication of a rule that specifies how the DU is to adjust a transmit power for transmitting a communication, as described above in connection with FIGS. 3-6.

As further shown in FIG. 10, in some aspects, process 1000 may include adjusting the transmit power based at least in part on the rule (block 1020). For example, the first node (e.g., using communication manager 150 and/or adjustment component 1408 depicted in FIG. 14) may adjust the transmit power based at least in part on the rule, as described above in connection with FIGS. 3-6.

As further shown in FIG. 10, in some aspects, process 1000 may include transmitting the communication using the transmit power (block 1030). For example, the first node (e.g., using communication manager 150 and/or transmission component 1404 depicted in FIG. 14) may transmit the communication using the transmit power, as described above in connection with FIGS. 3-6.

Process 1000 may include additional aspects, such as any single aspect or any combination of aspects described below and/or in connection with one or more other processes described elsewhere herein.

In a first aspect, the rule is associated with one or more of a measurement of a receive power from a neighboring DU cell, a measurement performed by a UE, detection of the neighboring DU cell, a quantity of UEs being served, a load or a remaining capacity of a serving DU cell, RACH statistics, mobility states of the serving DU cell, neighboring UEs, or neighboring network nodes, or a location or a zone of the serving DU cell.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
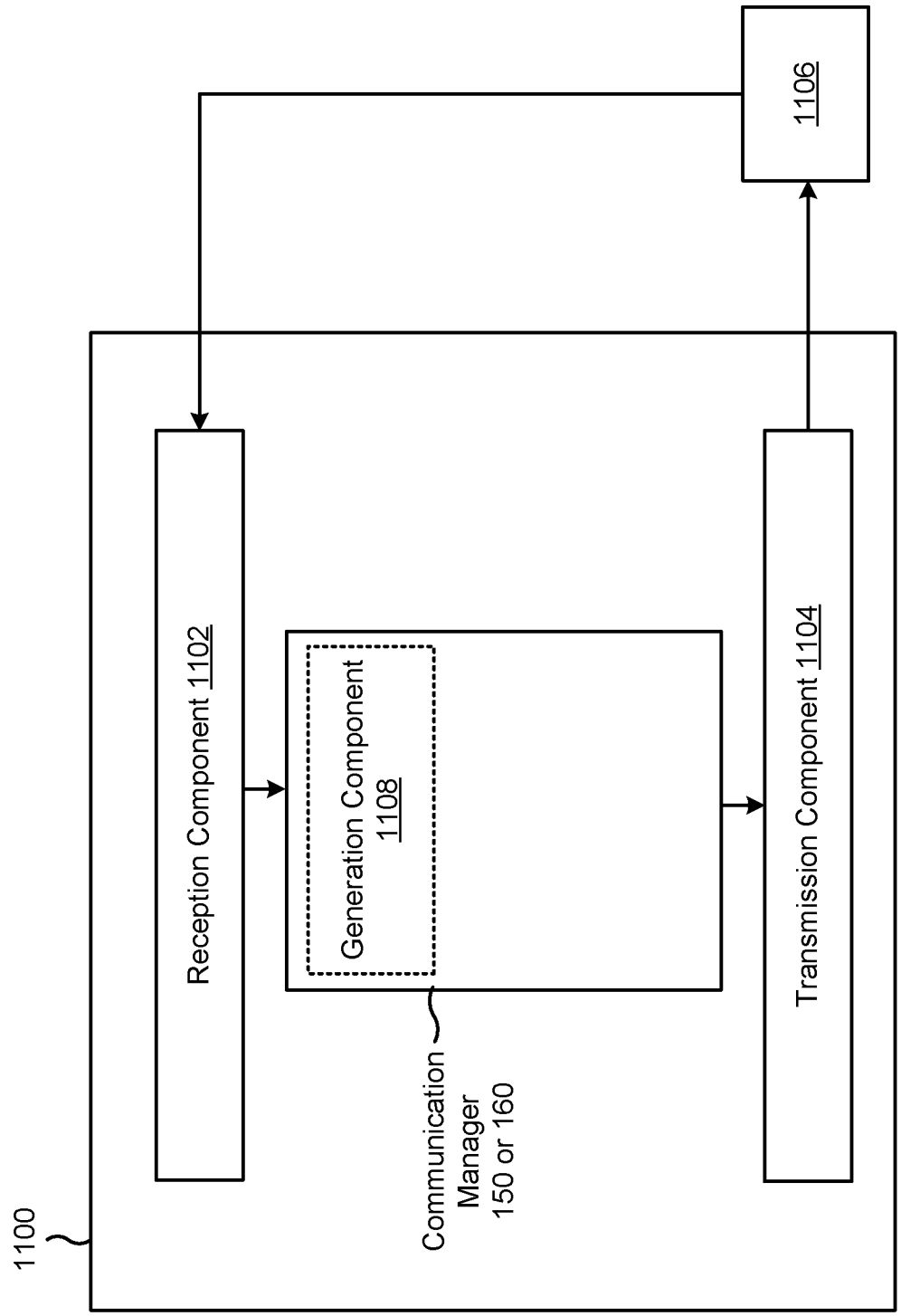
FIGS. 11-14 are diagrams of example apparatuses for wireless communication, in accordance with the present disclosure.

FIG. 11 is a diagram of an example apparatus 1100 for wireless communication. The apparatus 1100 may be a first node (e.g., base station 110, network node 130, first node 510, second node 520), or a first node may include the apparatus 1100. The first node may be part of an IAB network or another network with split CU/DU functionality. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150 or 160. The communication manager 150 or 160 may include a generation component 1108, among other examples.

In some aspects, the apparatus 1100 may be configured to perform one or more operations described herein in connection with FIGS. 1-6. Additionally, or alternatively, the apparatus 1100 may be configured to perform one or more processes described herein, such as process 700 of FIG. 7. In some aspects, the apparatus 1100 and/or one or more components shown in FIG. 11 may include one or more components of the first node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the first node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the first node described in connection with FIG. 2. In some aspects, the transmission component 1104 may be co-located with the reception component 1102 in a transceiver.

The generation component 1108 may generate transmit power information associated with the DU. The transmission component 1104 may transmit the transmit power information for the DU to a CU. The reception component 1102 may receive, from the CU in connection with transmitting the transmit power information, an indication of a transmit power parameter to use for transmitting a communication. The transmission component 1104 may transmit the communication with a transmit power that is based at least in part on the transmit power parameter. The transmit power parameter may include a transmit power, a maximum transmit power, a minimum transmit power, or a power ramping configuration.

The reception component 1102 may receive, from the CU, a request for the transmit power information, and transmitting the transmit power information includes transmitting the transmit power information in connection with receiving the request.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
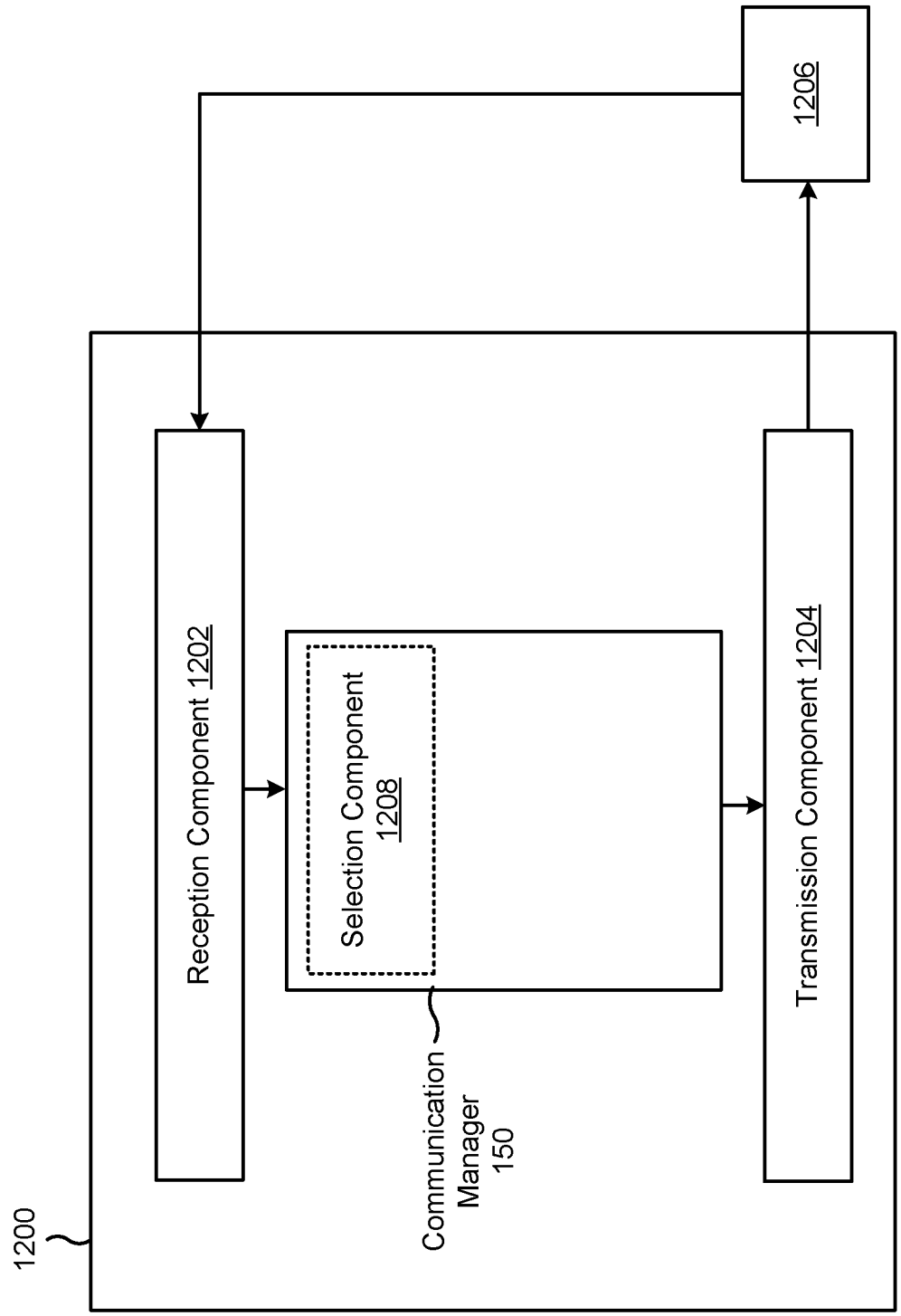

FIG. 12 is a diagram of an example apparatus 1200 for wireless communication. The apparatus 1200 may be a first node (e.g., base station 110, first node 510), or a first node may include the apparatus 1200. The first node may be part of an IAB network or another network with split CU/DU functionality. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, a network node, or another wireless communication device) using the reception component 1202 and the transmission component 1204. As further shown, the apparatus 1200 may include the communication manager 150. The communication manager 150 may include a selection component 1208, among other examples.

In some aspects, the apparatus 1200 may be configured to perform one or more operations described herein in connection with FIGS. 1-6. Additionally, or alternatively, the apparatus 1200 may be configured to perform one or more processes described herein, such as process 800 of FIG. 8. In some aspects, the apparatus 1200 and/or one or more components shown in FIG. 12 may include one or more components of the first node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the first node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the first node described in connection with FIG. 2. In some aspects, the transmission component 1204 may be co-located with the reception component 1202 in a transceiver.

The reception component 1202 may receive, by a CU of the apparatus 1200, transmit power information associated with a DU. The selection component 1208 may select a transmit power parameter for the DU to use for transmitting a communication based at least in part on the transmit power information and transmit power information associated with one or more other DUs. The transmission component 1204 may transmit, to the DU, an indication of the transmit power parameter.

The transmission component 1204 may transmit a request for the transmit power information, and receiving the transmit power information includes receiving the transmit power information in connection with transmitting the request. The reception component 1202 may receive, from a second node, a request for the transmit power or the transmit power parameter. The transmission component 1204 may transmit the indication of the transmit power parameter to the other node in connection with receiving the request.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
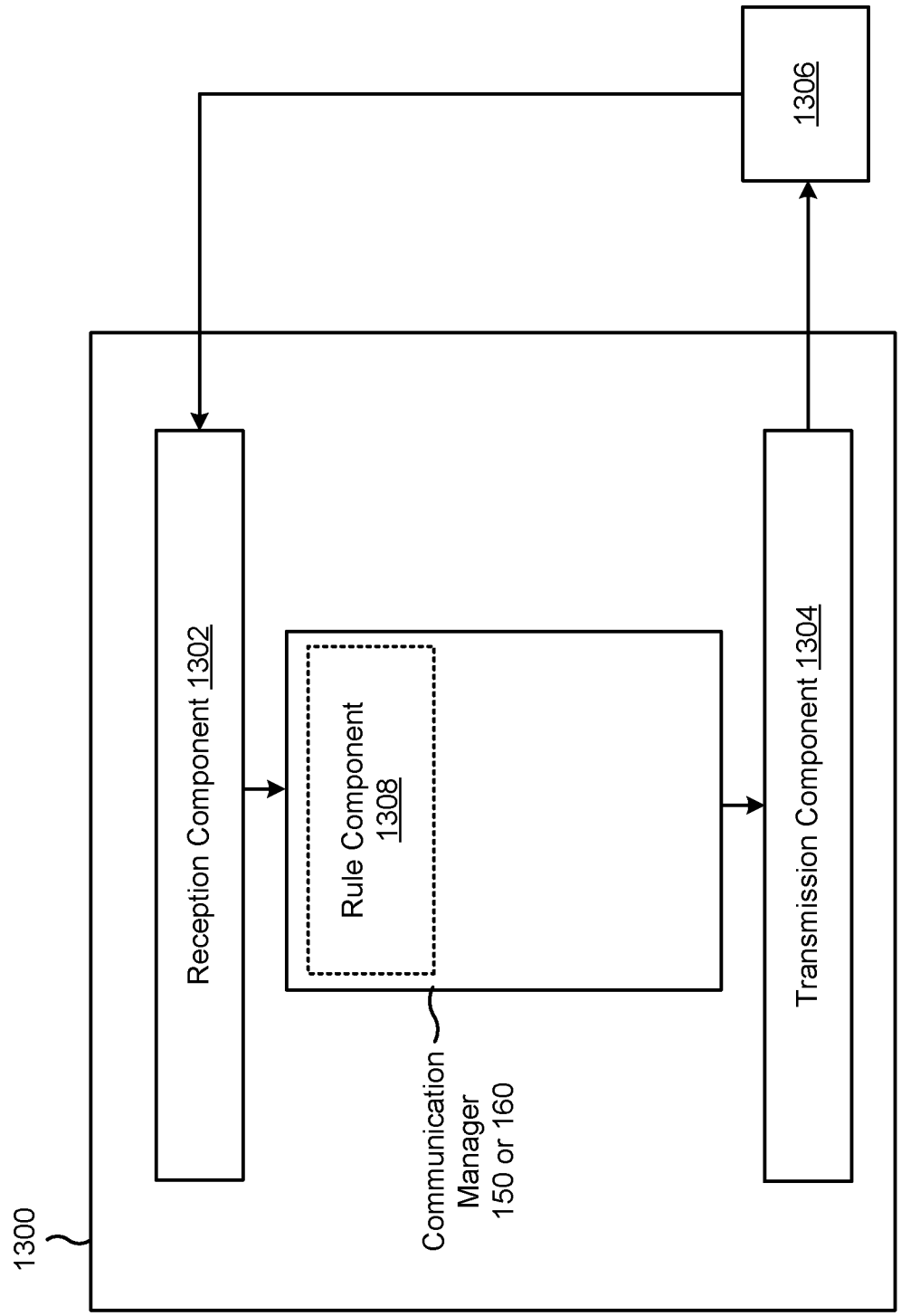

FIG. 13 is a diagram of an example apparatus 1300 for wireless communication. The apparatus 1300 may be a first node (e.g., base station 110, network node 130, first node 510, second node 520), or a first node may include the apparatus 1300. The first node may be part of an IAB network or another network with split CU/DU functionality. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150 or 160. The communication manager 150 or 160 may include a rule component 1308, among other examples.

In some aspects, the apparatus 1300 may be configured to perform one or more operations described herein in connection with FIGS. 1-6. Additionally, or alternatively, the apparatus 1300 may be configured to perform one or more processes described herein, such as process 900 of FIG. 9. In some aspects, the apparatus 1300 and/or one or more components shown in FIG. 13 may include one or more components of the first node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the first node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the first node described in connection with FIG. 2. In some aspects, the transmission component 1304 may be co-located with the reception component 1302 in a transceiver.

The rule component 1308 may configure, by a CU of the apparatus 1300 or another entity of the apparatus 1300, a rule that specifies how a DU is to adjust a transmit power of the DU. The transmission component 1304 may transmit, to the DU, an indication of the rule.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
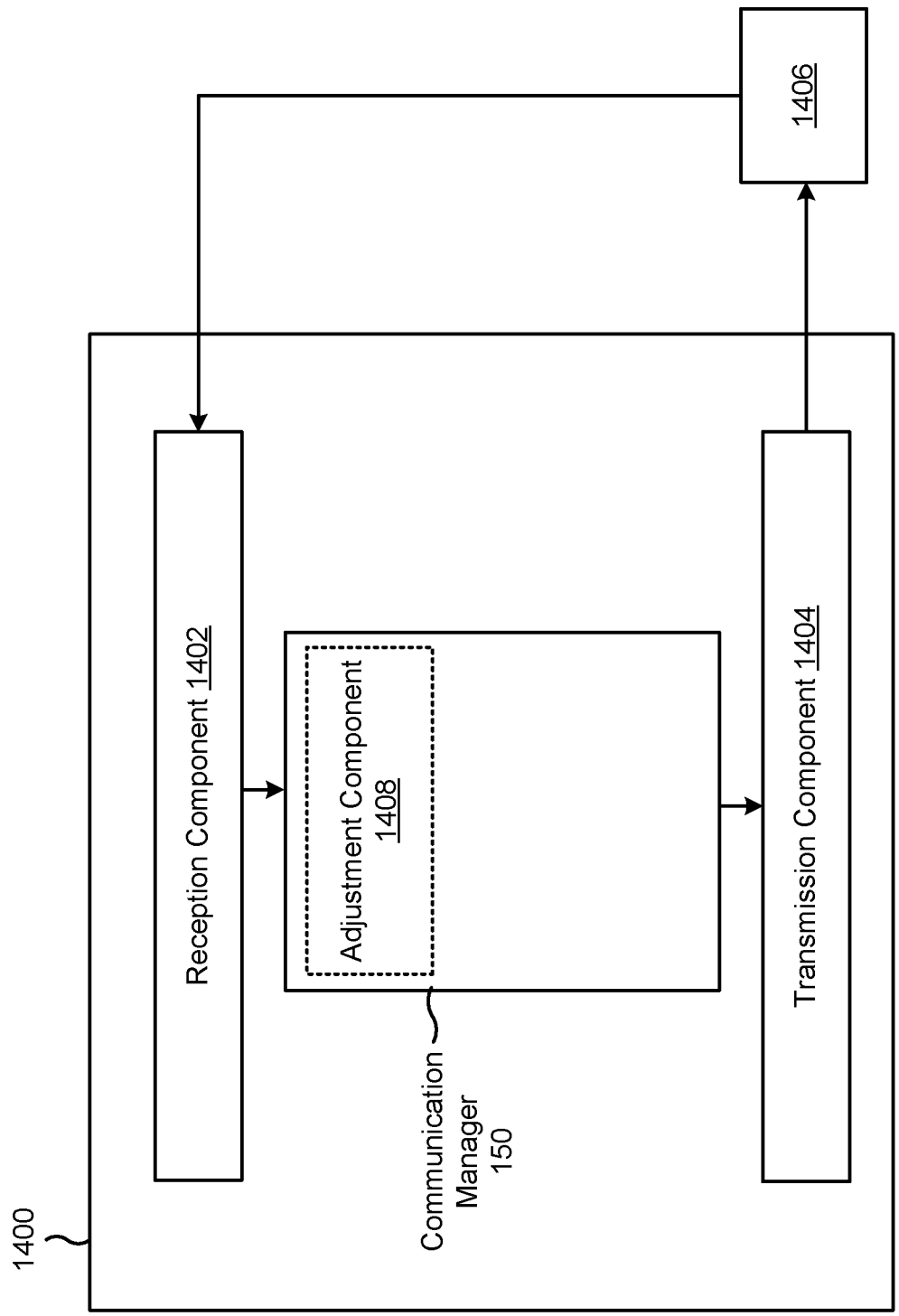

FIG. 14 is a diagram of an example apparatus 1400 for wireless communication. The apparatus 1400 may be a first node (e.g., base station 110, first node 510), or a first node may include the apparatus 1400. The first node may be part of an IAB network or another network with split CU/DU functionality. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include an adjustment component 1408, among other examples.

In some aspects, the apparatus 1400 may be configured to perform one or more operations described herein in connection with FIGS. 1-6. Additionally, or alternatively, the apparatus 1400 may be configured to perform one or more processes described herein, such as process 1000 of FIG. 10. In some aspects, the apparatus 1400 and/or one or more components shown in FIG. 14 may include one or more components of the first node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the first node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the first node described in connection with FIG. 2. In some aspects, the transmission component 1404 may be co-located with the reception component 1402 in a transceiver.

The reception component 1402 may receive, by a DU of the apparatus 1400, an indication of a rule that specifies how the DU is to adjust a transmit power for transmitting a communication. The adjustment component 1408 may adjust the transmit power based at least in part on the rule. The transmission component 1404 may transmit the communication using the transmit power.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a first node, comprising: transmitting transmit power information for a distributed unit (DU) to a central unit (CU); receiving, from the CU in connection with transmitting the transmit power information, an indication of a transmit power parameter to use for transmitting a communication; and transmitting the communication with a transmit power that is based at least in part on the transmit power parameter.

Aspect 2: The method of Aspect 1, wherein the transmit power information includes one or more of a transmit power configuration of the DU or a transmit power capability of the DU.

Aspect 3: The method of Aspect 1 or 2, wherein the first node includes the DU, and wherein transmitting the transmit power information includes transmitting the transmit power information from the DU.

Aspect 4: The method of any of Aspects 1-3, wherein the transmit power information includes one or more of a dynamic range for transmit power, a maximum transmit power, a minimum transmit power, a supported granularity of a transmit power change, a current transmit power, a transmit power headroom, a transmit power legroom, or a power setting change latency.

Aspect 5: The method of any of Aspects 1-4, wherein the transmit power information is for a total power across a bandwidth part or for a power spectral density.

Aspect 6: The method of any of Aspects 1-5, wherein the transmit power information is specific to a DU, a DU cell, a transmit receive point, a spatial resource, a frequency resource, a time resource, a child link, an access or a backhaul, a downlink signal type, a downlink channel type, a resource type, or a duplexing type.

Aspect 7: The method of any of Aspects 1-6, wherein transmitting the transmit power information includes transmitting the transmit power information via an F1 application protocol interface.

Aspect 8: The method of any of Aspects 1-7, further comprising receiving, from the CU, a request for the transmit power information, and wherein transmitting the transmit power information includes transmitting the transmit power information in connection with receiving the request.

Aspect 9: The method of any of Aspects 1-8, wherein the CU is in a second node in the IAB network, and wherein transmitting the transmit power information includes transmitting the transmit power information by a central unit (CU) of the first node to the CU in the second node via an Xn interface.

Aspect 10: The method of any of Aspects 1-2 and 4-8, wherein the first node is an operations, administration, and maintenance entity.

Aspect 11: The method of any of Aspects 1-10, wherein the transmit power parameter includes a transmit power, a maximum transmit power, a minimum transmit power, a power ramping configuration, a suggested transmit power, a suggested maximum transmit power, a suggested minimum transmit power, or a suggested power ramping configuration.

Aspect 12: The method of Aspect 11, wherein the transmit power parameter is specific to a DU, a DU cell, a transmit receive point, a spatial resource, a frequency resource, a time resource, a child link, an access or backhaul, a downlink signal type, a downlink channel type, a resource type, or a duplexing type.

Aspect 13: The method of Aspect 11 or 12, wherein receiving the transmit power parameter includes receiving the transmit power parameter via an F1 application protocol interface.

Aspect 14: The method of any of Aspects 1-13, wherein one or more of transmitting the transmit power information or receiving the indication includes using over-the-air signaling.

Aspect 15: A method of wireless communication performed by a first node, comprising: receiving, by a central unit (CU) of the first node, transmit power information associated with a distributed unit (DU); selecting a transmit power parameter for the DU to use for transmitting a communication based at least in part on the transmit power information and transmit power information associated with one or more other DUs; and transmitting, to the DU, an indication of the transmit power parameter.

Aspect 16: The method of Aspect 15, wherein receiving the transmit power information includes receiving the transmit power information from the DU, and wherein the DU is in the first node or in a second node.

Aspect 17: The method of Aspect 15 or 16, wherein the transmit power information includes one or more of a transmit power configuration of the DU or a transmit power capability of the DU.

Aspect 18: The method of any of Aspects 15-17, wherein the transmit power information includes one or more of a dynamic range for transmit power, a maximum transmit power, a minimum transmit power, a supported granularity of a transmit power change, a current transmit power, a transmit power headroom, a transmit power legroom, or a power setting change latency.

Aspect 19: The method of any of Aspects 15-18, wherein the transmit power information is for a total power across a bandwidth part or for a power spectral density.

Aspect 20: The method of any of Aspects 15-19, wherein the transmit power information is specific to the DU, a DU cell, a transmit receive point, a spatial resource, a frequency resource, a time resource, a child link, an access or backhaul, a downlink signal or channel type, a resource type, or a duplexing scenario.

Aspect 21: The method of any of Aspects 15-20, wherein receiving the transmit power information includes receiving the transmit power information via an F1 application protocol interface, from a CU of a second node via an Xn interface, or from an operations, administration, and maintenance entity.

Aspect 22: The method of any of Aspects 15-21, wherein the transmit power parameter includes a transmit power, a maximum transmit power, a minimum transmit power, a power ramping configuration, a suggested transmit power, a suggested maximum transmit power, a suggested minimum transmit power, or a suggested power ramping configuration.

Aspect 23: The method of any of Aspects 15-22, further comprising transmitting a request for the transmit power information, and wherein receiving the transmit power information includes receiving the transmit power information in connection with transmitting the request.

Aspect 24: The method of any of Aspects 15-23, further comprising: receiving, from a second node, a request for the transmit power parameter; and transmitting the indication of the transmit power parameter to the other node in connection with receiving the request.

Aspect 25: The method of any of Aspects 15-24, wherein the transmit power parameter is specific to the DU, a DU cell, a transmit receive point, a spatial resource, a frequency resource, a time resource, a child link, an access or backhaul, a downlink signal or channel type, a resource type, or a duplexing scenario.

Aspect 26: The method of any of Aspects 15-25, wherein one or more of receiving the transmit power information or transmitting the indication of the transmit power parameter includes using over-the-air signaling.

Aspect 27: A method of wireless communication performed by a first node, comprising: configuring, by a central unit (CU) of the first node or another entity of the first node, a rule that specifies how a distributed unit (DU) is to adjust a transmit power of the DU; and transmitting, to the DU, an indication of the rule.

Aspect 28: The method of Aspect 27, wherein the rule is associated with one or more of: a measurement of a receive power from a neighboring DU cell; a measurement performed by a user equipment (UE); detection of the neighboring DU cell; a quantity of UEs being served; a load or a remaining capacity of a serving DU cell; random access channel statistics; mobility states of the serving DU cell, neighboring UEs, or neighboring network nodes; or a location or a zone of the serving DU cell.

Aspect 29: A method of wireless communication performed by a first node, comprising: receiving, by a distributed unit (DU) of the first node, an indication of a rule that specifies how the DU is to adjust a transmit power for transmitting a communication; adjusting the transmit power based at least in part on the rule; and transmitting the communication using the transmit power.

Aspect 30: The method of Aspect 29, wherein the rule is associated with one or more of: a measurement of a receive power from a neighboring DU cell; a measurement performed by a user equipment (UE); detection of the neighboring DU cell; a quantity of UEs being served; a load or a remaining capacity of a serving DU cell; random access channel statistics; mobility states of the serving DU cell, neighboring UEs, or neighboring network nodes; or a location or a zone of the serving DU cell.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first node configured for wireless communication, comprising:
   a memory; and
   one or more processors, coupled to the memory, configured to:
      transmit transmit power information for a distributed unit (DU) to a central unit (CU);
      receive, from the CU in connection with transmitting the transmit power information, an indication of a transmit power parameter to use for transmitting a communication; and
      transmit the communication with a transmit power that is based at least in part on the transmit power parameter.

2. The first node of claim 1, wherein the transmit power information includes one or more of a transmit power configuration of the DU or a transmit power capability of the DU.

3. The first node of claim 1, wherein the first node includes the DU, and wherein the one or more processors, to transmit the transmit power information, are configured to transmit the transmit power information from the DU.

4. The first node of claim 1, wherein the transmit power information includes one or more of a dynamic range for transmit power, a maximum transmit power, a minimum transmit power, a supported granularity of a transmit power change, a current transmit power, a transmit power headroom, a transmit power legroom, or a power setting change latency.

5. The first node of claim 1, wherein the transmit power information is for a total power across a bandwidth part or for a power spectral density.

6. The first node of claim 1, wherein the transmit power information is specific to a DU, a DU cell, a transmit receive point, a spatial resource, a frequency resource, a time resource, a child link, an access or a backhaul, a downlink signal type, a downlink channel type, a resource type, or a duplexing type.

7. The first node of claim 1, wherein the one or more processors, to transmit the transmit power information, are configured to transmit the transmit power information via an F1 application protocol interface.

8. The first node of claim 1, wherein the one or more processors are configured to receive, from the CU, a request for the transmit power information, and wherein the one or more processors, to transmit the transmit power information, are configured to transmit the transmit power information in connection with receiving the request.

9. The first node of claim 1, wherein the CU is in a second node, and wherein the one or more processors, to transmit the transmit power information, are configured to transmit the transmit power information by a CU of the first node to the CU in the second node via an Xn interface.

10. The first node of claim 1, wherein the first node is an operations, administration, and maintenance entity.

11. The first node of claim 1, wherein the transmit power parameter includes a transmit power, a maximum transmit power, a minimum transmit power, a power ramping configuration, a suggested transmit power, a suggested maximum transmit power, a suggested minimum transmit power, or a suggested power ramping configuration.

12. The first node of claim 11, wherein the transmit power parameter is specific to a DU, a DU cell, a transmit receive point, a spatial resource, a frequency resource, a time resource, a child link, an access or backhaul, a downlink signal type, a downlink channel type, a resource type, or a duplexing type.

13. The first node of claim 11, wherein the one or more processors, to receive the indication, are configured to receive the indication via an F1 application protocol interface.

14. The first node of claim 1, wherein the one or more processors are configured to transmit the transmit power information or receive the indication using over-the-air signaling.

15. A first node configured for wireless communication, comprising:
a memory; and
one or more processors, coupled to the memory, configured to:
receive, by a central unit (CU) of the first node, transmit power information associated with a distributed unit (DU);
select a transmit power parameter for the DU to use for transmitting a communication based at least in part on the transmit power information and transmit power information associated with one or more other DUs; and
transmit, to the DU, an indication of the transmit power parameter.

16. The first node of claim 15, wherein the one or more processors, to receive the transmit power information, are configured to receive the transmit power information from the DU, and wherein the DU is in the first node or in a second node.

17. The first node of claim 15, wherein the transmit power information includes one or more of a transmit power configuration of the DU or a transmit power capability of the DU.

18. The first node of claim 15, wherein the transmit power information includes one or more of a dynamic range for transmit power, a maximum transmit power, a minimum transmit power, a supported granularity of a transmit power change, a current transmit power, a transmit power headroom, a transmit power legroom, or a power setting change latency.

19. The first node of claim 15, wherein the transmit power information is for a total power across a bandwidth part or for a power spectral density.

20. The first node of claim 15, wherein the transmit power information is specific to the DU, a DU cell, a transmit receive point, a spatial resource, a frequency resource, a time resource, a child link, an access or backhaul, a downlink signal or channel type, a resource type, or a duplexing scenario.

21. The first node of claim 15, wherein the one or more processors, to receive the transmit power information, are configured to receive the transmit power information via an F1 application protocol interface, from a CU of a second node via an Xn interface, or from an operations, administration, and maintenance entity.

22. The first node of claim 15, wherein the transmit power parameter includes a transmit power, a maximum transmit power, a minimum transmit power, a power ramping configuration, a suggested transmit power, a suggested maximum transmit power, a suggested minimum transmit power, or a suggested power ramping configuration.

23. The first node of claim 15, wherein the one or more processors are configured to transmit a request for the transmit power information, and wherein the one or more processors, to receive the transmit power information, are configured to receive the transmit power information in connection with transmitting the request.

24. The first node of claim 15, wherein the one or more processors are configured to:
receive, from a second node, a request for the transmit power parameter; and
transmit the indication of the transmit power parameter to the other node in connection with receiving the request.

25. The first node of claim 15, wherein the transmit power parameter is specific to the DU, a DU cell, a transmit receive point, a spatial resource, a frequency resource, a time resource, a child link, an access or backhaul, a downlink signal or channel type, a resource type, or a duplexing scenario.

26. The first node of claim 15, wherein the one or more processors are configured to receive the transmit power information or transmit the indication of the transmit power parameter using over-the-air signaling.

27. A first node configured for wireless communication, comprising:
a memory; and
one or more processors, coupled to the memory, configured to:
configure, by a central unit (CU) of the first node or another entity of the first node, a rule that specifies how a distributed unit (DU) is to adjust a transmit power of the DU; and
transmit, to the DU, an indication of the rule.

28. The first node of claim 27, wherein the rule is associated with one or more of:
a measurement of a receive power from a neighboring DU cell;
a measurement performed by a user equipment (UE);
detection of the neighboring DU cell;
a quantity of UEs being served;
a load or a remaining capacity of a serving DU cell;
random access channel statistics;
mobility states of the serving DU cell, neighboring UEs, or neighboring network nodes; or
a location or a zone of the serving DU cell.

29. A first node configured for wireless communication, comprising:
a memory; and
one or more processors, coupled to the memory, configured to:
receive, by a distributed unit (DU) of the first node, an indication of a rule that specifies how the DU is to adjust a transmit power for transmitting a communication;
adjust the transmit power based at least in part on the rule; and
transmit the communication using the transmit power.

30. The first node of claim 29, wherein the rule is associated with one or more of:
a measurement of a receive power from a neighboring DU cell;
a measurement performed by a user equipment (UE);
detection of the neighboring DU cell;
a quantity of UEs being served;
a load or a remaining capacity of a serving DU cell;
random access channel statistics;

mobility states of the serving DU cell, neighboring UEs, or neighboring network nodes; or a location or a zone of the serving DU cell.

* * * * *